US008208440B2

(12) United States Patent
Kim et al.

(10) Patent No.: US 8,208,440 B2
(45) Date of Patent: Jun. 26, 2012

(54) METHOD OF COMMUNICATION SUPPORTING MEDIA INDEPENDENT HANDOVER

(75) Inventors: Yong Ho Kim, Bucheon-si (KR); Yong Won Kwak, Anyang-si (KR); Jin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 285 days.

(21) Appl. No.: 12/485,824

(22) Filed: Jun. 16, 2009

(65) Prior Publication Data

US 2009/0252120 A1 Oct. 8, 2009

Related U.S. Application Data

(63) Continuation of application No. 11/399,942, filed on Apr. 6, 2006, now Pat. No. 7,596,118.

(30) Foreign Application Priority Data

Apr. 11, 2005 (KR) .................. 10-2005-0030077

(51) Int. Cl.
*H04W 4/00* (2009.01)
(52) U.S. Cl. ................... 370/330; 370/401; 455/436
(58) Field of Classification Search ............... None
See application file for complete search history.

(56) References Cited

U.S. PATENT DOCUMENTS

| | | | |
|---|---|---|---|
| 7,236,786 B2 | 6/2007 | Shen et al. | |
| 2002/0067721 A1 | 6/2002 | Kye | |
| 2005/0195822 A1 | 9/2005 | Lim et al. | |
| 2005/0249161 A1 | 11/2005 | Carlton | |
| 2005/0282546 A1 | 12/2005 | Chang et al. | |
| 2006/0160536 A1 | 7/2006 | Chou | |
| 2006/0227747 A1 | 10/2006 | Kim et al. | |
| 2008/0049674 A1 | 2/2008 | Cha et al. | |

FOREIGN PATENT DOCUMENTS

EP 1484897 12/2004

OTHER PUBLICATIONS

Liu, X. et al.: "Initial Proposal to IEEE 802.21 from Samsung," IEEE 802.21 Media Independent Handover Services, Jan. 2005.
Gupta, V. et al.: "Media Independent Handover", IEEE 802.21 Media Independent Handover Services, Jan. 2005.
Zaki, M. et al.: "802.16g Reference Models and Network Architecture," IEEE C802.16g-04/12, Nov. 2004.
Hoghooghi, M. et al.: "Media Independent Handover", IEEE 802.21 Media Independent Handover Services, Mar. 2005. IEEE Standards Committee, "Part 16: Air interface for Fixed Broadband Wireless Access Systems," 802.16 IEEE Standard for Local and Metropolitan Area Networks, Oct. 2004.
Gupta et al., "Media Independent Handover", IEEE 802.21 Media Independent Handover Services, Jan. 2005.
IEEE Computer Society et al., "IEEE Standard for Local and Metropolitan area networks Part 16: Air Interface for Fixed Broadband Wireless Access Systems" IEEE Std. 802.16-2004, Oct. 2004.
Liu, X., et al., "Initial Proposal to IEEE 802.21 from Samsung", Jan. 2005.

*Primary Examiner* — Bob Phunkulh
(74) *Attorney, Agent, or Firm* — Lee, Hong, Degerman, Kang & Waimey

(57) ABSTRACT

The present invention relates to performing handover of a mobile terminal to a network. Preferably, the present invention generates a first heterogeneous protocol message from a heterogeneous network handover module to a medium access control (MAC) of the mobile terminal, wherein the heterogeneous network handover module is configured to provide convergence of information from at least one network interface module associated with one of a homogeneous and heterogeneous network into a unified presentation. A management request associated with a handover process is then transmitted to a serving network, wherein the management request comprises the first heterogeneous protocol message. Accordingly, messages can be remotely exchanged via a radio section between heterogeneous network handover modules of a mobile terminal and a serving network. Therefore, messages are transferred faster and media independent handover is performed more quickly.

6 Claims, 24 Drawing Sheets

METHOD OF COMMUNICATION SUPPORTING MEDIA INDEPENDENT HANDOVER

CROSS-REFERENCE TO RELATED APPLICATIONS

This application is a continuation application of application Ser. No. 11/399,942 filed Apr. 6, 2006 (and issued as U.S. Pat. No. 7,596,118), which pursuant to 35 U.S.C. §119(a), claims the benefit of earlier filing date and right of priority to Korean Application No. 2005-0030077, filed on Apr. 11, 2005, the contents of which are hereby incorporated by reference herein in their entirety.

FIELD OF THE INVENTION

The present invention relates to performing handover in a broadband wireless access system, and more particularly, to a method of communication supporting media independent handover. Although the present invention is suitable for a wide scope of applications, it is particularly suitable for handover between media independent heterogeneous networks.

BACKGROUND OF THE INVENTION

FIG. 1 illustrates a protocol stack architecture of an IEEE 802.16 interface. Referring to FIG. 1, a service-specific convergence sublayer (CS) maps or transforms external communication network data received via a CS service access point (CS SAP) into medium access control entity service data units (MAC SDUs) received by a MAC common part sublayer (MAC CPS) via a MAC SAP. This transformation or mapping includes a function of identifying SDUs (service data units) of an external communication network to correlate a corresponding MAC SFID (service flow identifier) and a CID (connection identifier). Multi-CS regulations for various protocol interfaces are provided. An inner format of a CS payload is attributed to unique features of the CS. The MAC CPS is not required for analyzing information received from the CS payload or understanding a format.

The MAC CPS provides functions for system access, bandwidth allocation, access setting, and access maintenance and management as core functions of the MAC. The MAC CPS receives data classified according to a specific MAC access method from various CSs via the MAC SAP. The MAC CPS also exchanges data, such as PHY control and statistical data, with a PHY via a PHY SAP, which is a unique implementation scheme.

IEEE 802.21 aims for the international standardization of inter-heterogeneous-network media independent handover. Specifically, IEEE 802.21 endeavors to enhance user convenience when operating mobile terminal devices by providing seamless handover and service continuity between heterogeneous networks. A media independent handover (MIH) function, an event trigger, a command service and an information service (IS) are defined as basic requirements in the IEEE 802.21 standard specification.

A mobile subscriber station in media independent handover is a multi-mode node supporting at least one interface type. An interface can be implemented in various types. For example, a wire-line type interface such as an IEEE 802.3-based Ethernet, wireless interface types based on IEEE 802.XX interfaces including IEEE 802.11, IEEE 802.15, IEEE 802.16 and the like, and interfaces defined by a cellular standardization organization such as 3GPP, 3GPP2 and the like, are possible.

An information service for inter-heterogeneous-network handover is explained as follows. First, a media independent information service (MIIS) provides a similar frame network on a hierarchical heterogeneous network to facilitate a search and selection of various kinds of present networks. Namely, the media independent information service (MIIS) provides detailed information about a network needed to search and select a network and should be accessible from any kind of networks. The media independent information service (MIIS) should include the following information elements such as link access parameter, security mechanism, neighbor map, location, provider and other access information, cost of link and the like.

Media independent handover (MIH) may be defined between IEEE 802-series interfaces or between an IEEE 802-series interface and a non-IEEE 802-series interface, such as 3GPP or 3GPP2. Furthermore, a mobility supporting protocol of an upper layer such as a mobile Internet protocol (Mobile IP) and a session initiation protocol (SIP) should be supported for the seamless handover service.

FIG. 2 is a diagram of a general MIH reference model for supporting an MIH function. Referring to FIG. 2, service access points such as MIH_MGMT_SAP, MIH_SME_SAP, MIH_USER_SAP, MIH_MAC_SAP, MIH_PHY_SAP, LSAP and MIH_RRC_SAP exist for considering the MIH function.

The MIH_MGMT_SAP defines an interface between an MIH function layer and a management plane. MIH messages can be used for communications between peer MIH entities. MIH messages based on a management frame can be also sent unauthorized. The MIH_MGMT_SAP also defines primitives used for Media Independent Event Services, Media Independent Command Services and Media Independent Information Services.

The MIH_SME_SAP defines an interface between an MIH function layer and a station management entity (SME) defined by IEEE 802.11 or a network control and management system (NCMS) defined by IEEE 802.16. The MIH_SME_SAP can be identical to the MIH_MGMT_SAP.

The MIH_USER_SAP defines an interface for communication with an upper layer or higher (IP layer, i.e., at least protocol layer 3 or higher).

The MIH_MAC_SAP defines an interface between an MIH and a medium access control layer (MAC) of each technology (IEEE 802.11, IEEE 802.16, 3G, etc.). Interfaces defined by the MIH_MAC_SAP are mainly used in transferring MAC service data units (MSDUs) between peer entities. It is unnecessary to define a new interface and primitive for the MIH_MAC_SAP. However, interfaces defined through the MIH_MAC_SAP can be used in delivering payloads based on an MIH protocol to peer MIH entities.

The MIH_PHY_SAP defines an interface between an MIH and a physical layer (PHY) of each technology (IEEE 802.11, IEEE 802.16, 3G, etc.). The MIH communicates through the PHY of the corresponding technology using MACs of the corresponding technology. It is unnecessary to define new interfaces and primitives for the MIH_PHY_SAP.

The LSAP defines an interface between the MIH and a lower link control (LLC) layer. The MIH initiates a connection to a peer LLC entity to perform communication. The LSAP can directly use an LLC interface in establishing a data path to send MSDUs through other links. It is unnecessary to define new interfaces and primitives for the LSAP. The MIH_RRC_SAP defines an interface between an MIH function and a radio resource control (RRC) layer.

Messages used in the related art are explained as follows. A dynamic service addition request (DSA-REQ) message is transferred by a mobile subscriber station or base station to create a new service flow. Table 1 shows a DSA-REQ message format.

TABLE 1

| Syntax | Size | Notes |
|---|---|---|
| DSA-REQ_Message_Format( ) { | | |
| Management Message Type = 11 | 8 bits | |
| Transaction ID | 16 bits | |
| TLV Encoded Information | Variable | Specific TLV |
| } | | |

In Table 1, a DSA-REQ message is created by a mobile subscriber station or base station and includes parameters such as a connection identifier (CID), a transaction identifier (Transaction ID), etc. The CID is included in a general MAC header and represents a Primary Management CID of a mobile subscriber station. The Transaction ID represents a unique ID of a transaction assigned by a transmitting side. All other parameters are coded as threshold limit value (TLV) tuples.

The DSA-REQ message may not include a parameter for at least one service flow. The DSA-REQ message should include parameters such as Service Flow Parameters, Convergence Sublayer Parameter Encodings and a Hash-Based Message Authentication Code (HMAC) Tuple. The Service Flow Parameters represent regulations for traffic characteristics and scheduling conditions of service flow. The Convergence Sublayer Parameter Encodings represent regulations for specific CS parameters of service flow. The HMAC Tuple includes a key-designated message digest for authorizing a transmitting side. The HMAC Tuple attribute should correspond to a last attribute in an attribute list of a DSx message.

A dynamic service addition response (DSA-RSP) message is a message generated in response to a received DSA-REQ message. Table 2 shows a DSA-RSP message format.

TABLE 2

| Syntax | Size | Notes |
|---|---|---|
| DSA-RSP_Message_Format( ) { | | |
| Management Message Type = 12 | 8 bits | |
| Transaction ID | 16 bits | |
| Confirmation Code | 8 bits | |
| TLV Encoded Information | variable | Specific TLV |
| } | | |

In Table 2, a DSA-RSP message includes parameters such as a CID, a Transaction ID, a Confirmation Code, etc. The CID is included in a general MAC header and represents a Primary Management CID of a mobile subscriber station. The Transaction ID is a transaction ID of a corresponding DSA-REQ and represents a unique ID of a transaction assigned by a transmitting side. The Confirmation Code corresponds to the entire DSA-REQ message and has an 8-bit length. All other parameters are coded as TLV tuples.

If a transaction is successfully performed, Service Flow Parameters and CS Parameter Encodings should be included in the DSA-RSP message. If a newly allocated CID, an extended Service Class Name or a specific parameter indication (corresponding to a case of CC="reject-not-supported-parameter-value" or "reject-not-supported-parameter" only) causing access generation rejection is included in all regulations of a service flow, the DSA-RSP message includes all regulations of the service flow. The CS Parameter Encodings is a parameter representing regulations of specific parameters of the service flow.

If a transaction is not successfully performed, a Service Flow Error Set should be included in the DSA-RSP message. The DSA-RSP message should include the Service Flow Error Set and a service flow reference/SFID identifying function for each failed service flow. All failed specific QoS parameters of a corresponding service flow should be included in each Service Flow Error Set. The Service Flow Error Set is omitted if the entire DSA-REQ message is successfully performed.

The DSA-RSP message includes an HMAC Tuple regardless of success/failure of transaction execution. The HMAC Tuple attribute includes a key-designated message to authorize a transmitting side. The HMAC Tuple attribute should correspond to a last attribute in an attribute list of a DSx message.

A dynamic service addition acknowledgment (DSA-ACK) message is a response message to the DSA-RSP message. Table 3 shows a DSA-ACK message format.

TABLE 3

| Syntax | Size | Notes |
|---|---|---|
| DSA-ACK_Message_Format( ) { | | |
| Management Message Type = 13 | 8 bits | |
| Transaction ID | 16 bits | |
| Confirmation Code | 8 bits | |
| TLV Encoded Information | variable | Specific TLV |
| } | | |

In Table 3, a DSA-ACK message includes parameters such as a CID, Transaction ID, Confirmation Code, etc. The CID is included in a general MAC header and represents a Primary Management CID of a mobile subscriber station. The Transaction ID is a transaction ID of a corresponding DSA-REQ message and represents a unique ID of a transaction assigned by a transmitting side. The Confirmation Code corresponds to the entire DSA-REQ message and has an 8-bit length. All other parameters are coded as TLV tuples.

A Service Flow Error Set of the DSA-ACK message encodes specific items of service flows having failed in transmitting the DSA-RSP message. A corresponding DSA-REQ message should include a function of confirming the Service Flow Error Set and a service flow reference for all failed QoS parameters of all failed service flows. The Service Flow Error Set of the DSA-ACK message is omitted if the entire DSA-REQ message is successfully performed.

An HMAC Tuple attribute of the DSA-ACK message includes a key-designated message digest to authorize a transmitting side. The HMAC Tuple attribute should correspond to a last attribute in an attribute list of a DSx message.

Table 4 shows an included field when a mobile subscriber station transmits the DSA-REQ message. A base station receives the message and then identifies a format of a connection established by the CS through this field.

TABLE 4

| Type | Length | Value | Scope |
|---|---|---|---|
| [145/146].28 | 1 | 0: No CS | DSx-REQ |
| | | 1: Packet, IPv4 | |
| | | 2: Packet, IPv6 | |
| | | 3: Packet, 802.3/Ethernet | |
| | | 4: Packet, 802.1Q VLAN | |
| | | 5: Packet, IPv4 over 802.3/Ethernet | |
| | | 6: Packet, IPv6 over 802.3/Ethernet | |
| | | 7: Packet, IPv4 over 802.1Q VLAN | |
| | | 8: Packet, IPv6 over 802.1Q VLAN | |
| | | 9: ATM | |

TABLE 4-continued

| Type | Length | Value | Scope |
|------|--------|-------|-------|
| | | 10: Packet, IPv4 with Header Compression (ROHC) | |
| | | 11: Packet, IPv4 with Header Compression (ECRTP) | |
| | | 12: Packet, IPv6 with Header Compression (ROHC) | |
| | | 13: Packet, IPv6 with Header Compression (ECRTP) | |
| | | 14: Packet, IPv4 over 802.3/Ethernet with Header Compression (ROHC) | |
| | | 15: Packet, IPv4 over 802.3/Ethernet with Header Compression (ECRTP) | |
| | | 16: Packet, IPv6 over 802.3/Ethernet with Header Compression (ROHC) | |
| | | 17: Packet, IPv6 over 802.3/Ethernet with Header Compression (ROHC) | |
| | | 18: Packet, IPv4 over 802.1Q VLAN with Header Compression (ROHC) | |
| | | 19: Packet, IPv4 over 802.1Q VLAN with Header Compression (ECRTP) | |
| | | 20: Packet, IPv6 over 802.1Q VLAN with Header Compression (ROHC) | |
| | | 21: Packet, IPv6 over 802.1Q VLAN with (ECRTP) Header Compression | |
| | | 22~255: reserved | |

Each CS defines a parameter set encoded within a sub-index with the following cst values. In case of an IP for an IEEE 802.xx interface, associated IP and IEEE 802.xx parameters are included in a DSx-REQ message. Definitions for CS and cst are shown in Table 5.

TABLE 5

| cst | CS |
|-----|-----|
| 99 | ATM |
| 100 | Packet, IPv4 |
| 101 | Packet, IPv6 |
| 102 | Packet, 802.3/Ethernet |
| 103 | Packet, 802.1Q VLAN |
| 104 | Packet, IPv4 over 802.3/Ethernet |
| 105 | Packet, IPv6 over 802.3/Ethernet |
| 106 | Packet, IPv4 over 802.1Q VLAN |
| 107 | Packet, IPv6 over 802.1Q VLAN |
| 108 | Packet, IPv4 with Header Compression (ROHC) |
| 109 | Packet, IPv4 with Header Compression (ECRTP) |
| 110 | Packet, IPv6 with Header Compression (ROHC) |
| 111 | Packet, IPv6 with Header Compression (ECRTP) |
| 112 | Packet, IPv4 over 802.3/Ethernet with Header Compression (ROHC) |
| 113 | Packet, IPv4 over 802.3/Ethernet with Header Compression (ECRTP) |
| 114 | Packet, IPv6 over 802.3/Ethernet with Header Compression (ROHC) |
| 115 | Packet, IPv6 over 802.3/Ethernet with Header Compression (ROHC) |
| 116 | Packet, IPv4 over 802.1Q VLAN with Header Compression (ROHC) |
| 117 | Packet, IPv4 over 802.1Q VLAN with Header Compression (ECRTP) |
| 118 | Packet, IPv6 over 802.1Q VLAN with Header Compression (ROHC) |
| 119 | Packet, IPv6 over 802.1Q VLAN with Header Compression (ECRTP) |

Meanwhile, the CS and primitives of a MAC_SAP for a MAC service are explained as follows.

FIG. 3 is a diagram of a signal flow for a MAC service request and response, in which a request primitive is used for an initial request of a service. Referring to FIG. 3, if the CS delivers a request primitive to a Peer MAC, the Peer MAC creates an indication primitive to deliver to an original requesting entity, i.e., the CS. The CS then creates a response primitive in response to the indication primitive and then delivers it to the Peer MAC. The MAC having received the response primitive delivers a confirmation primitive to the CS.

1) MAC_CREATE_SERVICE FLOW.request

Function: The CS entity of a base station device (hereinafter called BS) or a subscriber device (e.g., mobile subscriber station, etc.) (hereinafter called SS) requests dynamic addition of connection.

Semantics:

MAC__CREATE__SERVICE FLOW.request
(
MAC Address
scheduling service type,
convergence sublayer,
service flow parameters,
payload header suppression indicator,
encryption indicator,
Packing on/off indicator,
Fixed-length or variable-length SDU indicator,
SDU length (only needed for fixed-length SDU connections),
CRC request,
ARQ parameters,
sequence number
)

Creation Timing: The present primitive is created when the CS of a BS or an SS sets a new connection in the BS.

Effect of Receipt: In case that the present primitive is created by the SS, the SS sends a DSA-REQ message request to a MAC of the BS. On the other hand, if the present primitive is created by the BS, the BS checks the validity of the request.

2) MAC_CREATE_SERVICE FLOW.indication

Function: The present primitive is sent by a non-initiating MAC entity. After reception of the DSA-REQ message, the present primitive is transmitted in response to the received message. If the non-initiating MAC entity lies in a BS side, an SFID and available CIDs are created and a request is authorized.

Semantics:

MAC__CREATE__SERVICE FLOW.indication
(
service type,
convergence sublayer,
service flow parameters,
sequence number
)

Creation Timing: Once the DSA-REQ message is received, the present primitive is created by a non-initiating side MAC.

Effect of Receipt: The CS checks validity of the request and accepts or rejects the corresponding request through a MAC_CREATE_SERVICE FLOW.response primitive.

3) MAC_CREATE_SERVICE FLOW.response

Function: The MAC_CREATE_SERVICE FLOW.response is created by a non-initiating MAC entity in response to the MAC_CREATE_SERVICE FLOW.indication.

Semantics:

```
MAC_CREATE_SERVICE FLOW.response
(
Connection ID,
response code,
response message,
sequence number,
ARQ parameters
)
```

Creation Timing: Once the MAC_CREATE_SERVICE FLOW.indication is received, the present primitive is created by a non-initiating CS.
Effect of Receipt: The MAC sends a DSA-RSP message.
4) MAC_CREATE_SERVICE FLOW.confirmation
Function: The MAC_CREATE_SERVICE FLOW.confirmation confirms that a convergence entity provides a requested connection.
Semantics:

```
MAC_CREATE_SERVICE FLOW.confirmation
(
Connection ID,
response code,
response message,
sequence number
)
```

Creation Timing: The present primitive is created by an initiating MAC entity when a DSA-RSP message is received.
Effect of Receipt: It is confirmed that a convergence entity functions as a connection requested for a transmission request.
5) MAC_CHANGE_SERVICE FLOW.request
6) MAC_CHANGE_SERVICE FLOW.indication
7) MAC_CHANGE_SERVICE FLOW.response
8) MAC_CHANGE_SERVICE FLOW.confirmation An existing connection may change characteristics (e.g., bandwidth requirement) of various criteria. The primitives in 5), 6) 7) and 8) above have the same semantics and effect of receipt of the CREATE primitive.
9) MAC_TERMINATE_SERVICE FLOW.request
Function: Termination of connection is requested by a CS side of a BS or SS.
Semantics:

```
MAC_TERMINATE_SERVICE FLOW.request
(
SFID
)
```

Creation Timing: The present primitive is created when the CS of the BS or the SS requests to terminate a connection.
Effect of Receipt: Creation in SS side—MAC passes a request to a MAC entity in the BS via a dynamic service deletion request (DSD-REQ) message and the BS terminates a connection after examination of the validity of the request. Creation in BS side—Validity of request is already decided and the BS MAC informs the SS of the validity by sending the DSD-REQ message.

10) MAC_TERMINATE_SERVICE FLOW.indication
Function: A non-initiating MAC entity requests to terminate a connection corresponding to a DSD-REQ message.
Semantics:

```
MAC_TERMINATE_SERVICE FLOW.indication
(
SFID
)
```

Creation Timing: The present primitive is created when receiving a DSD-REQ message to terminate a connection or if necessary to terminate a connection by any reason.
Effect of Receipt: The BS checks validity of a request. A receiving CS returns a MAC_TERMINATE_SERVICE FLOW.response primitive and erases the SFID.
11) MAC_TERMINATE_SERVICE FLOW.response
Function: The present primitive is a response to a request to terminate a connection.
Semantics:

```
MAC_TERMINATE_SERVICE FLOW.response
(
SFID,
response code,
response message
)
```

Creation Timing: The present primitive is created when the CS receives the MAC_TERMINATE_SERVICE FLOW.indication from the MAC.
Effect of Receipt: The MAC sends a message to an initiating side via a DSD-RSP message.
12) MAC_TERMINATE_SERVICE FLOW.confirmation
Function: A convergence entity is made to confirm that a requested connection is terminated.
Semantics:

```
MAC_TERMINATE_SERVICE FLOW.confirmation
(
SFID,
response code,
response message
)
```

Creation Timing: The present primitive is created when the CS receives the MAC_TERMINATE_SERVICE FLOW.indication from the MAC.
Effect of Receipt: A convergence entity is informed that a connection is terminated. The same CID is not used anymore for data transfer.
13) MAC_DATA.request
Function: The present primitive defines a data transfer to a MAC entity from a CS SAP.
Semantics:

```
MAC_DATA.request
(
Connection ID,
length,
data,
discard-eligible flag
)
```

Creation Timing: The present primitive is created by the CS each time a MAC SDU is transferred to a peer entity.

Effect of Receipt: A MAC entity processes the MAC SDU through the MAC and passes an appropriately formatted PDU to a PHY convergence sublayer.

14) MAC_DATA.indication

Function: The present primitive defines a data transfer from a MAC entity to the CS.

Semantics:

```
MAC_DATA.indication
(
Connection ID,
length,
data,
reception status
)
```

Creation Timing: The present primitive is created each time a MAC SDU is transferred to a peer convergence entity.

Effect of Receipt: Independent of a content or validity of the MAC SDU. A selection of the CS is decided by the CID with which the MAC SDU is sent.

A media independent handover (MIH) function will now be explained in detail as follows. The MIH is placed below an IP layer and facilitates a handover handling process using a trigger event and an input value from a second layer (Layer 2), such as information of other networks and the like. The MIH can include input values based on user policy and configuration that can influence the handover process. General interfaces are defined between the MIH function and a third layer (Layer 3) entity such as a Mobile IP and an SIP. These interfaces provide information about a first layer (Layer 1) or physical layer (PHY), the second layer (Layer 2) (MAC layer) and mobility management. The MIH acquires information about lower layers and networks with the help of the event and information services. Hence, the MIH function should be placed in a higher layer to monitor and control statuses of other links within the mobile subscriber station.

FIG. 4 is a diagram of functional entities and transport protocols of a terminal including an MIH function and a network. Dotted lines indicate a primitive, an event trigger and the like. FIG. 5 is an exemplary diagram of a broadband wireless access network system (IEEE 802.16) in a protocol stack considering MIH. A stack model shown in FIG. 5 is equivalently applicable to a base station and a mobile subscriber station. However, the mobile subscriber station, which should consider a multi-stack terminal in multi-mode, has a configuration that includes parts shown in the drawing.

A Convergence Sublayer (CS) of an IEEE 802.16 interface in a broadband wireless access system will be explained as follows. A service-specific CS is placed above a MAC CPS and uses a service provided by the MAC CPS via a MAC SAP. The CS performs the following functions: 1) Receiving a higher PDU from a higher layer; 2) Classifying PDUs of a higher layer; 3) Handling PDUs of a higher layer according to classification (if requested); 4) Delivering CS PDUs to a corresponding MAC SAP; and 5) Receiving CS PDUs from a peer entity.

According to current CS regulations, two types of CSs are provided, i.e., an asynchronous transfer mode (ATM) and a packet CS. Other CSs may be provided in the future. The packet CS is placed above the IEEE 802.16 MAC CPS. Moreover, the packet CS performs the following functions using the services of a MAC: 1) Classifying a higher layer protocol PDU by corresponding access; 2) Suppressing payload header information (options); 3) Delivering CS PDU as a result to a MAC SAP associated with a service flow to enable a transfer to a Peer MAC SAP; 4) Receiving a CS PDU from a Peer MAC SAP; and 5) Reconfiguring suppressed payload header information (option).

A transmitting side CS delivers a MAC SDU to a MAC SAP. A MAC delivers the MAC SDU to a peer MAC SAP according to QoS, separation, connection and other transfer functions associated with a service flow of a specific access. A receiving side CS receives the MAC SDU from the peer MAC SAP and then delivers it to an entity of a higher layer.

A Packet CS is used in transferring all packet-oriented protocols such as IP (Internet Protocol), PPP (point-to-point protocol), IEEE 802.3 (Ethernet) and the like.

FIG. 6 is a diagram of a MAC SDU format. Referring to FIG. 6, a PDU of a higher layer is classified and should be quickly included in the MAC SDU as related to a specific MAC access. In case that a PHS (payload header suppression) rule is defined for the related access, the MAC SDU should include a PHSI (payload header suppression index) field having an 8-bit length.

Classification is a process according to a MAC SDU that is mapped to a specific access for transfer between MAC peers. The mapping process relates the MAC SDU to a specific access and a relationship is established using a service flow characteristic of the specific access. By this process, the MAC SDU is able to be delivered together with a corresponding QoS constraint.

A classifier is a group of consistency references applied to each transport packet of a broadband wireless access communication network. The classifier is configured with a partial packet consistency reference of a specific protocol (e.g., IP address of a called party), a classifier priority and a reference for a CID. If one packet coincides with a specific packet consistency reference, the corresponding packet is delivered to an SAP to be delivered on an access defined by the CID. Optionally, each specific classification function is implemented (e.g., IPv4 based classification). A service flow characteristic of the access provides a QoS for a corresponding packet.

As several classifiers are able to refer to the same service flow, classifier priority is used in designating a sequence for applying classifiers to packets. Since patterns used by the classifiers may overlap each other, a clear sequence should be designated. In designating the sequence, unique priority is unnecessary. Yet, the sequence designation should be carefully conducted within the classifier priority to prevent vagueness in classification. A downlink classifier is transmitted by a base station, wherein the base station conducts the classifier's application to a packet. An uplink classifier is applied by a mobile subscriber station. FIG. 7 and FIG. 8 show the above-explained mapping.

A procedure for Service Flow Creation will now be explained as follows. A mobile subscriber station having completed a network entry procedure enters a service flow registration procedure between a base station and a terminal for data delivery. Service flow includes a service flow identifier (SFID) identifying a corresponding service flow between the base station and the mobile subscriber station, a connection identifier (CID) identifying a connection for delivering service flow traffic, a quality of service (QoS) parameter indicating a quality of the service flow, and the like.

FIG. 9 is a diagram of a procedure for creating a service flow according to a request made by a mobile subscriber station. FIG. 10 is a diagram of a procedure for creating a service flow according to a request made by a base station.

Service flow is created by a MAC management message exchange between a mobile subscriber station and a base station according to a request made by the mobile subscriber station or the base station.

Referring to FIG. 9, when a mobile subscriber station requests creation of a service flow, the mobile subscriber station requests service flow creation having a specific quality of service via a dynamic service addition request (DSA-REQ) message. A base station then delivers approval or rejection of the service flow creation to the mobile subscriber station via a dynamic service addition response (DSA-RSP) message. If the service flow creation is approved, the base station grants a service flow identifier (SFID) and a connection identifier (CID) to the corresponding service flow to create the service flow between the mobile subscriber station and the base station. After completion of the service flow creation, the mobile subscriber station and the base station exchange user data via the corresponding service flow.

Referring to FIG. 10, when a base station requests creation of a service flow, the base station requests service flow creation having a specific quality of service via a DSA-REQ message and delivers an SFID and a CID to a mobile subscriber station. The mobile subscriber station having received the DSA-REQ message delivers approval or rejection of the service flow creation to the base station via a DSA-RSP message. After completion of the service flow creation, the mobile subscriber station and the base station exchange user data via the corresponding service flow.

FIG. 11 is a flowchart of a MAC SAP event and a MAC event for connection creation. FIG. 12 is a flowchart of a real MAC event associated with a MAC SAP event for a connection change. FIG. 13 is a flowchart of a MAC SAP event and a MAC event for a connection deletion. FIGS. 11 to 13 show mutual actions between MAC service primitives and DSx messages, respectively.

However, in the related art communication method for MIH, if a newly established MIH layer attempts to send a message to a remote MIH entity via a radio section, a communication method between MIH entities is not determined. Hence, message transactions between the MIH entities are impossible.

SUMMARY OF THE INVENTION

The present invention is directed to performing handover of a mobile terminal to a network.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for performing handover of a mobile terminal to a network, the method comprising generating a first heterogeneous protocol message from a heterogeneous network handover module to a medium access control (MAC) of the mobile terminal, wherein the heterogeneous network handover module is configured to provide convergence of information from at least one network interface module associated with one of a homogeneous and heterogeneous network into a unified presentation, and transmitting a management request associated with a handover process to a serving network, wherein the management request comprises the first heterogeneous protocol message.

In one aspect of the present invention, the method further comprises receiving a management response associated with the handover process from the serving network, wherein the management response comprises a second heterogeneous protocol message prepared by the serving network and communicating the second heterogeneous protocol message to the heterogeneous network handover module of the mobile terminal.

Preferably, the first heterogeneous protocol message comprises at least one of a handover imminent message and a control and management message related to the heterogeneous network handover module. Preferably, the first heterogeneous protocol message comprises at least one of event data, command data and information data. Preferably, the management request is provided from the heterogeneous network handover module and is communicated to the MAC through one of a control service access point and a management service access point.

In accordance with another embodiment of the present invention, a method for performing handover of a mobile terminal to a network comprises receiving in a medium access control (MAC) of a serving network a management request associated with a handover process from the mobile terminal, wherein the management request comprises a first heterogeneous protocol message and communicating the first heterogeneous protocol message to a heterogeneous network handover module of the serving network, wherein the heterogeneous network handover module is configured to provide convergence of information from at least one network interface module associated with one of a homogeneous and heterogeneous network into a unified presentation.

In one aspect of the invention, the method further comprises generating a second heterogeneous protocol message in the heterogeneous network handover module of the serving network in response to the first heterogeneous protocol message, communicating the second heterogeneous protocol message from the heterogeneous network handover module to the medium access control (MAC) of the serving network, and transmitting a management response associated with the handover process to the mobile terminal, wherein the management response comprises the second heterogeneous protocol message.

Preferably, the first heterogeneous protocol message comprises at least one of a handover imminent message and a control and management message related to the heterogeneous network handover module. Preferably, the first heterogeneous protocol message comprises at least one of event data, command data and information data. Preferably, the management response is provided from the heterogeneous network handover module and is communicated to the MAC through one of a control service access point and a management service access point.

In accordance with another embodiment of the present invention, a method for performing handover from a mobile terminal to a network comprises providing a heterogeneous protocol message from a heterogeneous network handover module to a convergence sublayer module, wherein the heterogeneous network handover module is configured to provide convergence of information from at least one network interface module associated with one of a homogeneous and heterogeneous network into a unified presentation, providing a service flow creation request from the convergence sublayer module to a medium access control (MAC) of the mobile terminal in response to the heterogeneous protocol message, transmitting a request to a serving network, the request being associated with setting up a protocol to communicate the heterogeneous protocol message, receiving a response associated with setting up the protocol to communicate the heterogeneous protocol message, and communicating a service flow creation confirmation from the MAC to the convergence sublayer module.

Preferably, the heterogeneous protocol message is communicated to the serving network through a frame having an identifier for distinguishing the heterogeneous protocol message.

In one aspect of the invention, the method further comprises providing the heterogeneous protocol message from the convergence sublayer module of the mobile terminal to a heterogeneous network handover module of the serving network. In another aspect of the invention, the method further comprises transmitting an acknowledgment to the serving network for acknowledging successful receipt of the response associated with setting up the protocol to communicate the heterogeneous protocol message.

Preferably, the heterogeneous protocol message comprises at least one of event data, command data and information data.

In accordance with another embodiment of the present invention, a method for performing handover from a mobile terminal to a network comprises receiving a request in a medium access control (MAC) of a serving network, wherein the request is associated with setting up a protocol to communicate a heterogeneous protocol message, providing a service flow creation indication from the medium access control (MAC) to a convergence sublayer module of the serving network in response to the request, communicating the service flow creation indication from a convergence sublayer module to a heterogeneous network handover module of the serving network, wherein the heterogeneous network handover module is configured to provide convergence of information from at least one network interface module associated with one of a homogeneous and heterogeneous network into unified presentation, providing a service flow creation response from the heterogeneous network handover module to the convergence sublayer module in response to the service flow creation indication, communicating the service flow creation response from the convergence sublayer module to the medium access control (MAC), and transmitting a response to the mobile terminal, wherein the response is associated with setting up the protocol to communicate the heterogeneous protocol message.

Preferably, the heterogeneous protocol message is communicated to the serving network through a frame having an identifier for distinguishing the heterogeneous protocol message.

In one aspect of the present invention, the method further comprises receiving the heterogeneous protocol message from a convergence sublayer module of the mobile terminal to the heterogeneous network handover module of the serving network. In another aspect of the present invention, the method further comprises receiving an acknowledgment from the mobile terminal for acknowledging successful receipt of the response associated with setting up the protocol to communicate the heterogeneous protocol message.

Preferably, the heterogeneous protocol message comprises at least one of event data, command data and information data.

In accordance with another embodiment of the present invention, a method for performing handover from a mobile terminal to a network comprises receiving a request in a medium access control (MAC) of a serving network, wherein the request is associated with setting up a protocol to communicate a heterogeneous protocol message, providing a service flow creation indication from the medium access control (MAC) to a convergence sublayer module of the serving network in response to the request, providing a service flow creation response from the convergence sublayer module to the medium access control (MAC) in response to the service flow creation indication, and transmitting a response to the mobile terminal, wherein the response is associated with setting up the protocol to communicate the heterogeneous protocol message.

Preferably, the heterogeneous protocol message is communicated to the serving network through a frame having an identifier for distinguishing the heterogeneous protocol message.

In one aspect of the invention, the method further comprises receiving the heterogeneous protocol message from a convergence sublayer module of the mobile terminal to a heterogeneous network handover module of the serving network, wherein the heterogeneous network handover module is configured to provide convergence of information from at least one network interface module associated with one of a homogeneous and heterogeneous network into a unified presentation.

In another aspect of the invention, the method further comprises receiving an acknowledgment from the mobile terminal for acknowledging successful receipt of the response associated with setting up the protocol to communicate the heterogeneous protocol message.

Preferably, the heterogeneous protocol message comprises at least one of event data, command data and information data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
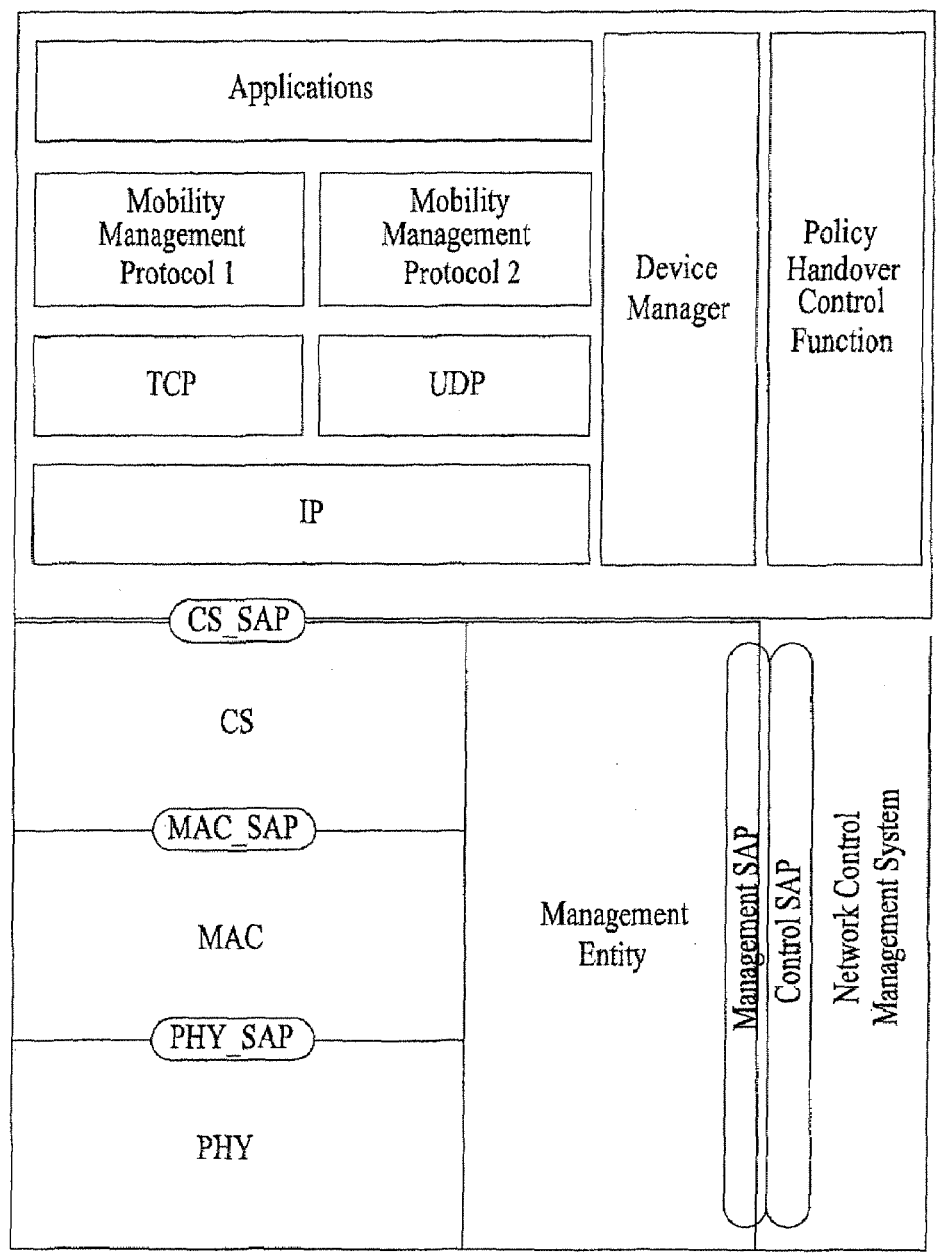
FIG. 1 illustrates a protocol stack architecture of an IEEE 802.16 interface.
Figure 2:
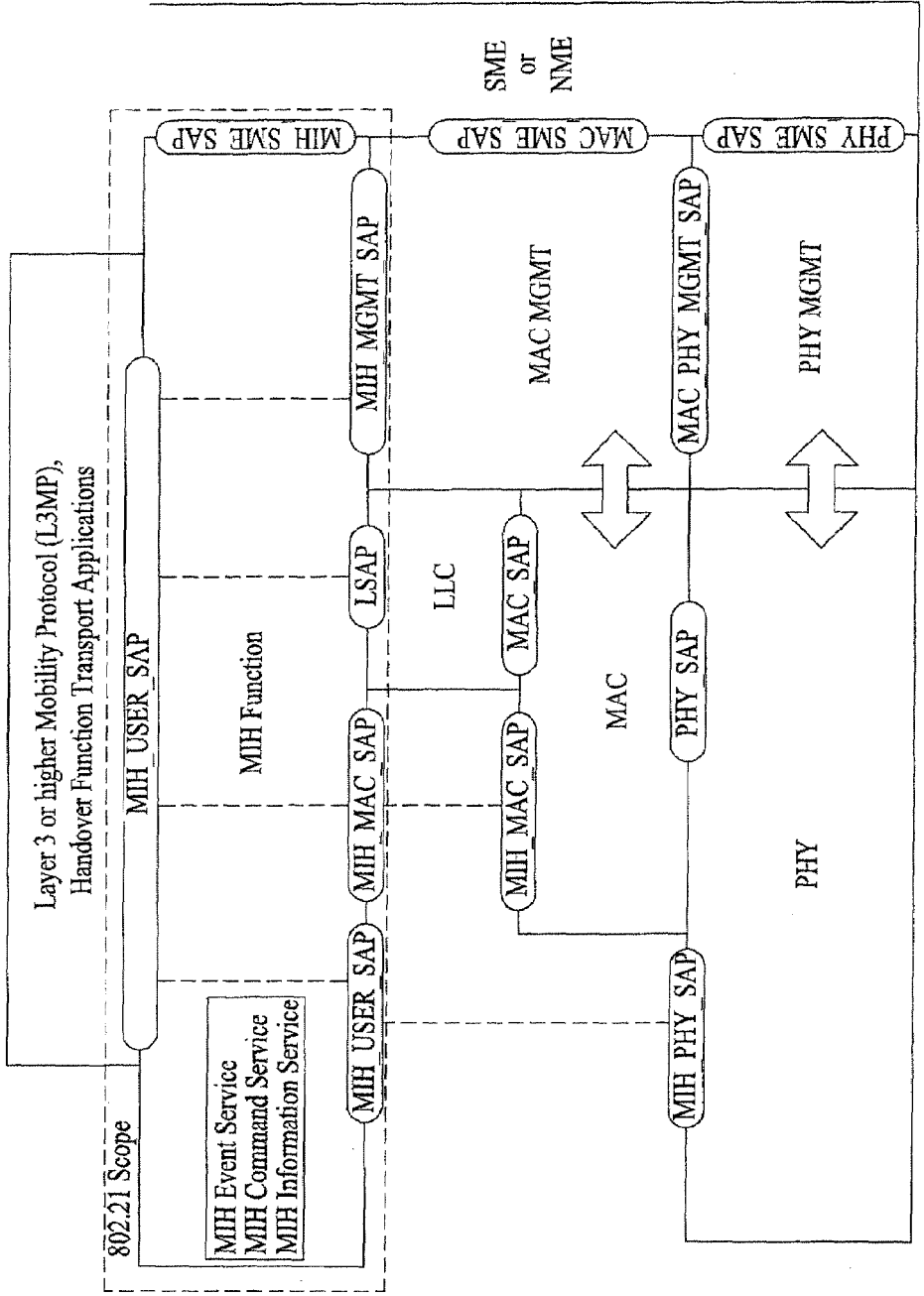
FIG. 2 is a diagram of a general media independent handover (MIH) reference model for supporting an MIH function.
Figure 3:
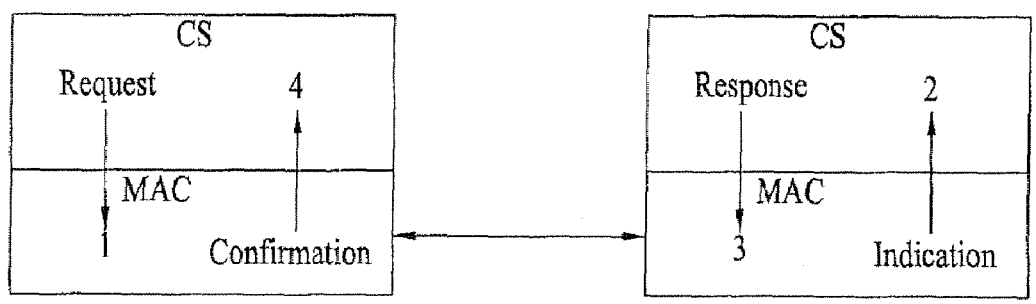
FIG. 3 is a diagram of a signal flow for a medium access control (MAC) service request and response, in which a request primitive is used for an initial request of a service.
Figure 4:
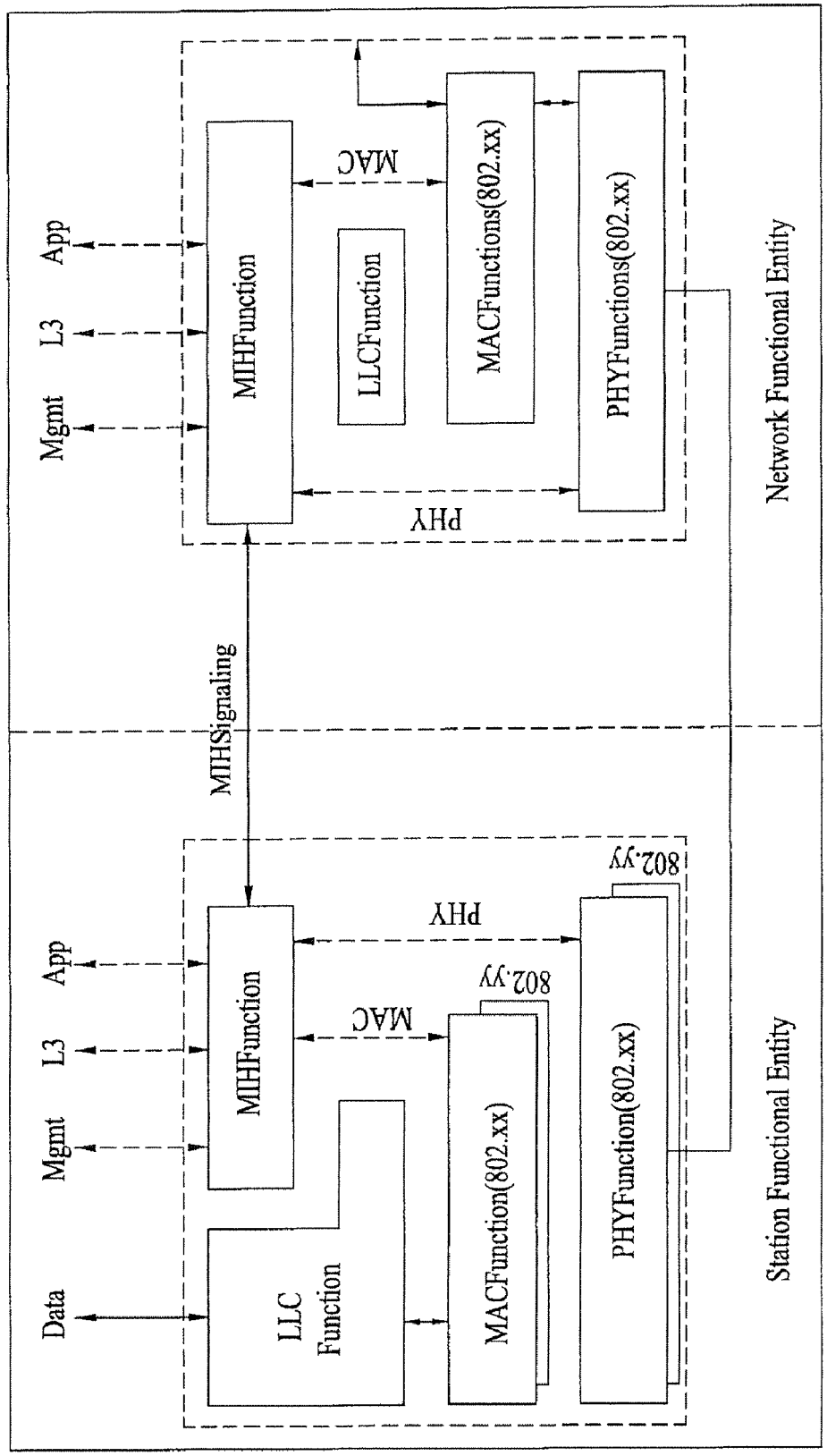
FIG. 4 is a diagram of functional entities and transport protocols of a terminal including an MIH function and a network.
Figure 5:
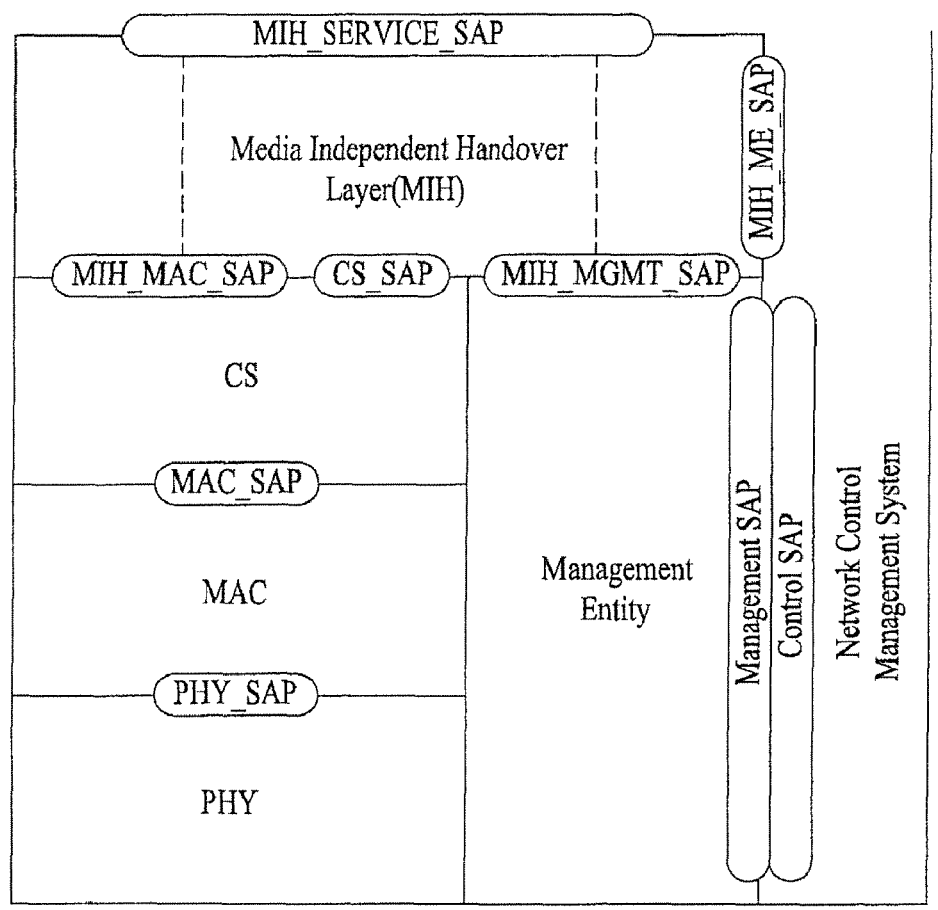
FIG. 5 is an exemplary diagram of a broadband wireless access network system (IEEE 802.16) in a protocol stack considering MIH.
Figure 6:
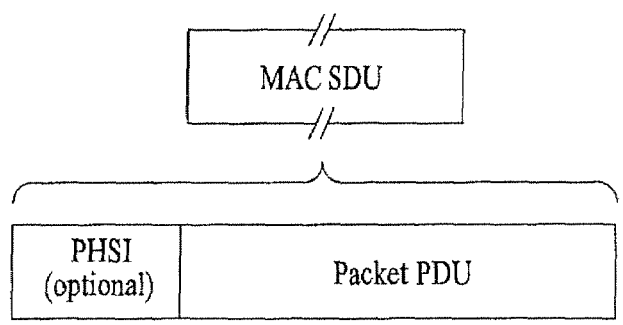
FIG. 6 is a diagram of a MAC service data unit (SDU) format.
Figure 7:
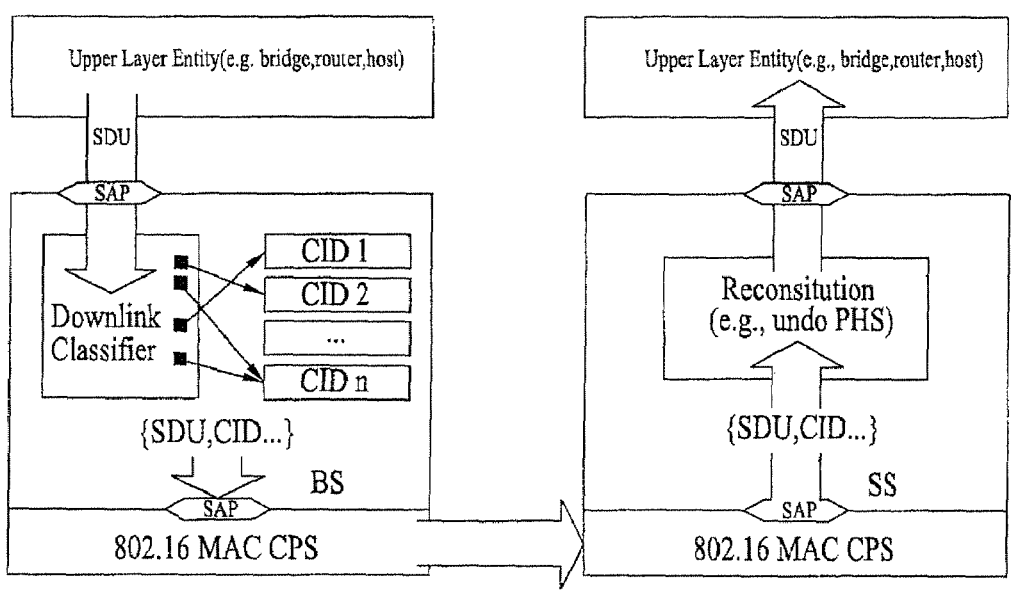
FIG. 7 is a diagram of classification and connection identifier (CID) mapping from a base station (BS) to a mobile terminal or subscriber station (SS).
Figure 8:
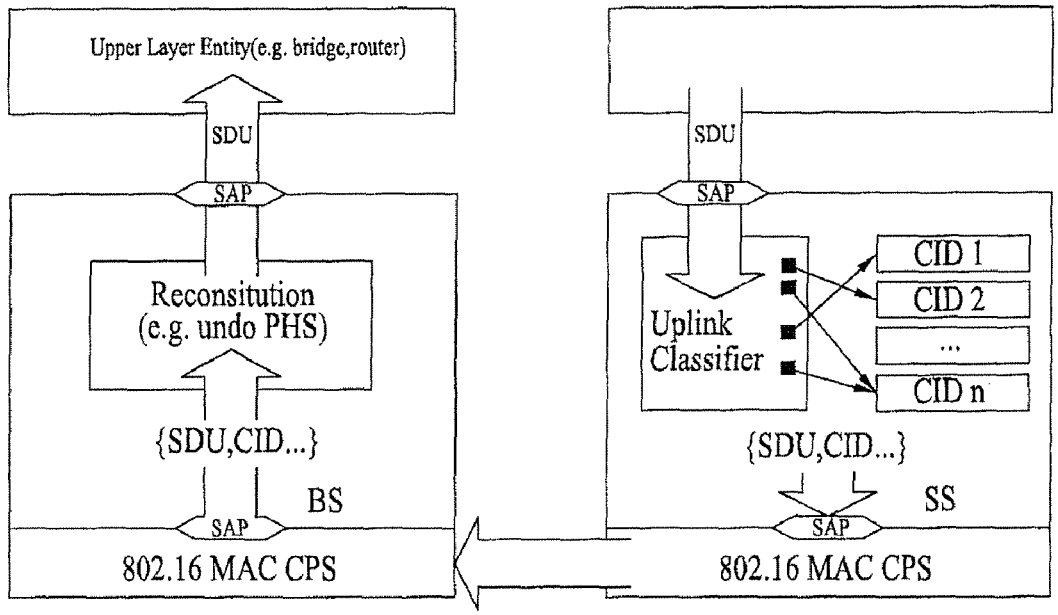
FIG. 8 is a diagram of classification and CID mapping from a mobile terminal to a base station.
Figure 9:
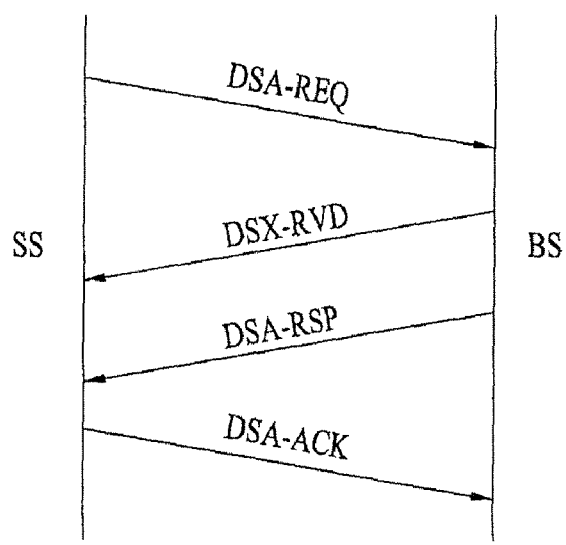
FIG. 9 is a diagram of a procedure for creating a service flow according to a request made by a mobile terminal.
Figure 10:
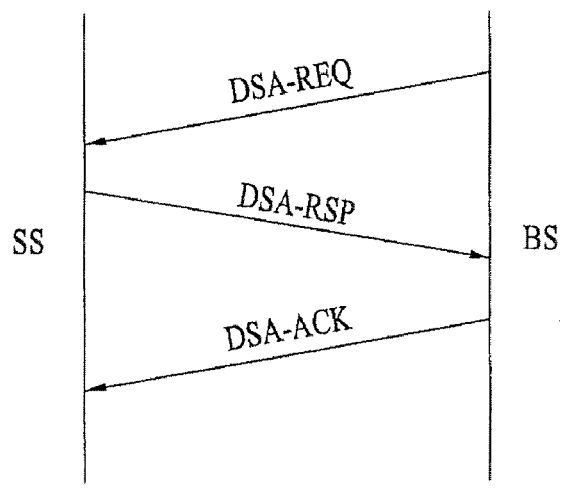
FIG. 10 is a diagram of a procedure for creating a service flow according to a request made by a base station.
Figure 11:
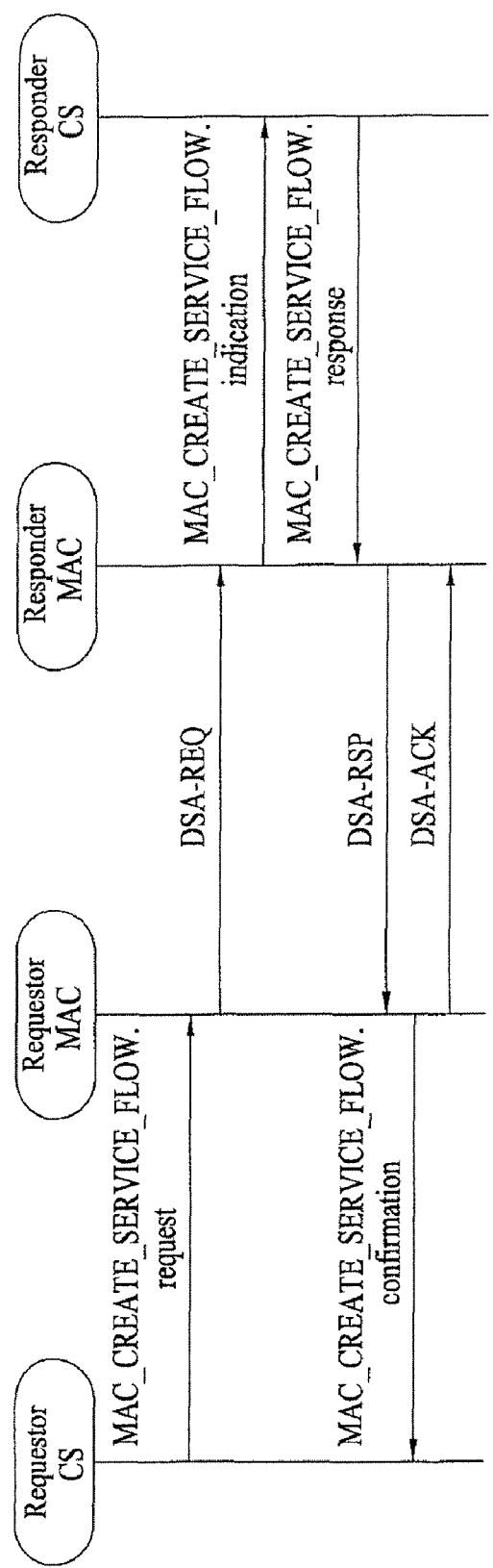
FIG. 11 is a flowchart of a MAC service access point (SAP) event and a MAC event for connection creation.
Figure 12:
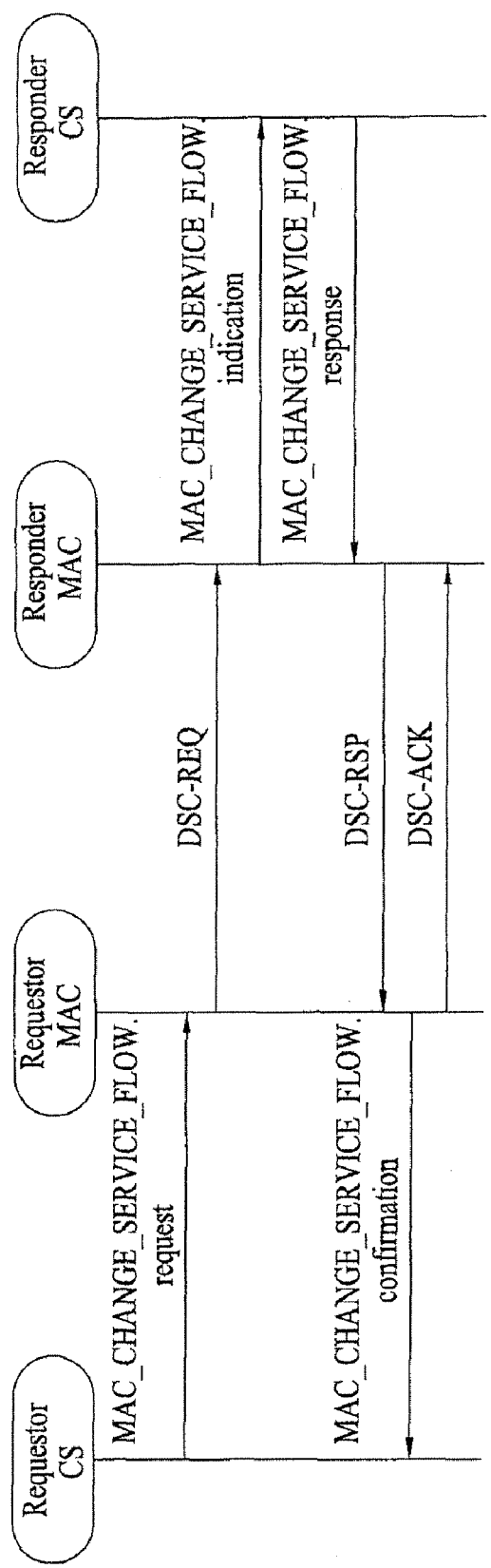
FIG. 12 is a flowchart of a real MAC event associated with a MAC SAP event for a connection change.
Figure 13:
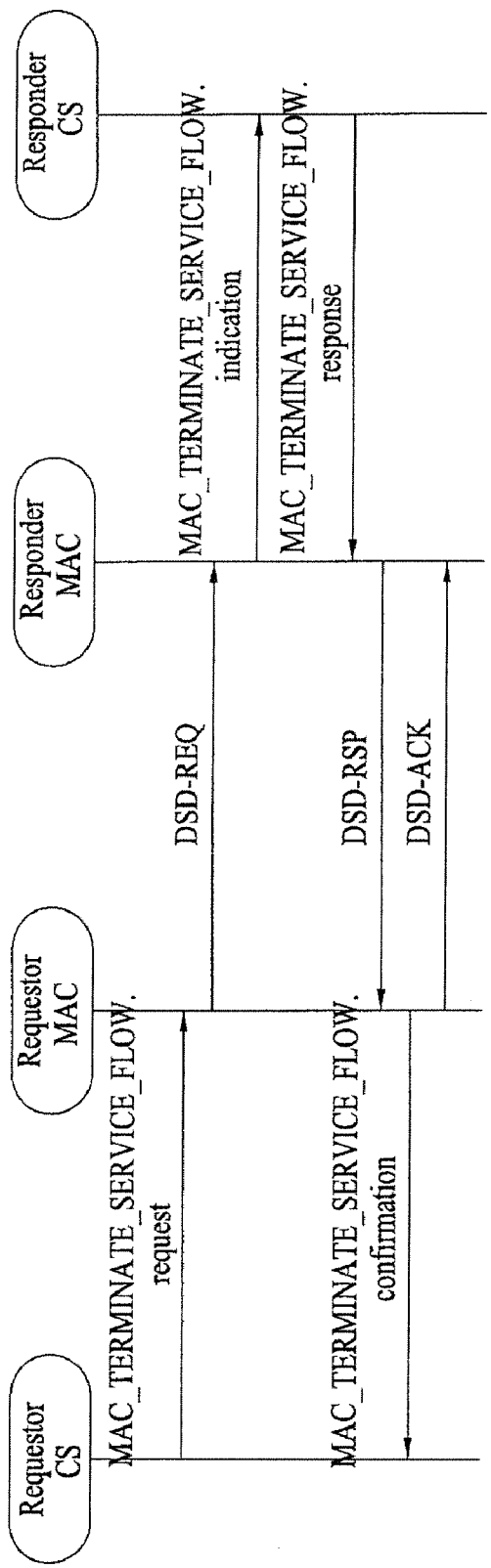
FIG. 13 is a flowchart of a MAC SAP event and a MAC event for a connection deletion.

The present invention relates to performing handover of a mobile terminal to a network. Reference will now be made in detail to the preferred embodiments of the present invention, examples of which are illustrated in the accompanying drawings. Wherever possible, the same reference numbers will be used throughout the drawings to refer to the same or like parts.

Media independent handover (MIH) entities of a mobile terminal or mobile subscriber station (SS) and a base station (BS) mutually exchange MIH messages via Layer 2 or below and Layer 3 or above. The present invention relates to a method of delivering MIH messages using Layer 2 or below in a protocol architecture model. The present invention can be divided into a first method for delivering data packets via communications between MIHs and a second method for delivering data packets via a Control/Management Plane.

In the first method, MIH data is transferred in a data burst format via an air interface, wherein communications are executed after termination of a network access step. In the second method, communication is via a MAC management message, wherein the communication is performed by receiving (setting) a Management Connection ID. Hence, the second method enables faster message exchange.

In accordance with one embodiment of the present invention, a first method for delivering data packets comprises a Method of Transmitting a Data Burst in a Data Packet Format via a Radio Interface Section. In order for MIH layers of a subscriber station (SS) and base station (BS) to transmit/receive MIH data mutually, a definition of a type for enabling classification from another type of data is needed. Furthermore, a classifying entity called a classifier existing in a CS layer classifies messages via information indicated by the type.

Table 6 shows an example of an MIH type newly appended to a field included to classify a type of connection established in a DSA-REQ message to achieve the above.

TABLE 6

| Type | Length | Value | Scope |
|---|---|---|---|
| [145/146].28 | 1 | 0: No CS<br>1: Packet, IPv4<br>2: Packet, IPv6<br>3: Packet, 802.3/Ethernet<br>4: Packet, 802.1Q VLAN<br>5: Packet, IPv4 over 802.3/Ethernet<br>6: Packet, IPv6 over 802.3/Ethernet<br>7: Packet, IPv4 over 802.1Q VLAN<br>8: Packet, IPv6 over 802.1Q VLAN<br>9: ATM<br>10: Packet, IPv4 with Header Compression (ROHC)<br>11: Packet, IPv4 with Header Compression (ECRTP)<br>12: Packet, IPv6 with Header Compression (ROHC)<br>13: Packet, IPv6 with Header Compression (ECRTP)<br>14: Packet, IPv4 over 802.3/Ethernet with Header Compression (ROHC)<br>15: Packet, IPv4 over 802.3/Ethernet with Header Compression (ECRTP)<br>16: Packet, IPv6 over 802.3/Ethernet with Header Compression (ROHC)<br>17: Packet, IPv6 over 802.3/Ethernet with Header Compression (ROHC)<br>18: Packet, IPv4 over 802.1Q VLAN with Header Compression (ROHC)<br>19: Packet, IPv4 over 802.1Q VLAN with Header Compression (ECRTP)<br>20: Packet, IPv6 over 802.1Q VLAN with Header Compression (ROHC)<br>21: Packet, IPv6 over 802.1Q VLAN with Header Compression (ECRTP)<br>22: MIH (Media Independent Handover)<br>23~255: reserved | DSx-REQ |

In Table 6, a parameter "22" among parameters indicates that a mutually exchanged packet should be delivered to the MIH in case that a mutual service is established between a mobile subscriber terminal and a base station. All packets delivered via a Connection ID mapped to this connection are delivered to the MIH layer via an MIH_MAC_SAP.

Each CS defines a parameter set encoded within a subindex in the following "cst" values. Definitions regarding the CS and cst are shown in Table 7.

TABLE 7

| cst | CS |
|---|---|
| 99 | ATM |
| 100 | Packet, IPv4 |
| 101 | Packet, IPv6 |
| 102 | Packet, 802.3/Ethernet |
| 103 | Packet, 802.1Q VLAN |
| 104 | Packet, IPv4 over 802.3/Ethernet |
| 105 | Packet, IPv6 over 802.3/Ethernet |
| 106 | Packet, IPv4 over 802.1Q VLAN |
| 107 | Packet, IPv6 over 802.1Q VLAN |
| 108 | Packet, IPv4 with Header Compression (ROHC) |
| 109 | Packet, IPv4 with Header Compression (ECRTP) |
| 110 | Packet, IPv6 with Header Compression (ROHC) |
| 111 | Packet, IPv6 with Header Compression (ECRTP) |
| 112 | Packet, IPv4 over 802.3/Ethernet with Header Compression (ROHC) |
| 113 | Packet, IPv4 over 802.3/Ethernet with Header Compression (ECRTP) |
| 114 | Packet, IPv6 over 802.3/Ethernet with Header Compression (ROHC) |
| 115 | Packet, IPv6 over 802.3/Ethernet with Header Compression (ROHC) |
| 116 | Packet, IPv4 over 802.1Q VLAN with Header Compression (ROHC) |
| 117 | Packet, IPv4 over 802.1Q VLAN with Header Compression (ECRTP) |
| 118 | Packet, IPv6 over 802.1Q VLAN with Header Compression (ROHC) |
| 119 | Packet, IPv6 over 802.1Q VLAN with Header Compression (ECRTP) |
| 120 | MIH (Media Independent Handover) |

In accordance with the present invention, primitives between the MIH and the CS defined as follows.

1) MAC_DATA_CREAT.request
Function: The MIH of a base station (BS) or subscriber station (SS) side requests dynamic addition of connection from the CS to make a future transfer of an MIH signal in a data format.
Creation Timing: Created when the MIH of the BS or the SS creates a new connection in the CS.
Effect of Receipt: The CS transfers a MAC_CREATE_SERVICE FLOW.request to the MAC.

2) MIH_DATA_CREAT.indication
Function: Sent by a receiving side CS and plays a role in informing the existence of an MIH message a receiving side MIH shall receive in a data format.
Creation Timing: Sent by a receiving side CS and created when the CS receives a MAC_CREATE_SERVICE FLOW.indication from the MAC.
Effect of Receipt: Receiving side MIH is able to know that there exists an MIH message sent to itself and decides whether it can accommodate a corresponding connection.

3) MIH_DATA_CREAT.response
Function: Created by a non-initiating MIH entity in response to an MIH_DATA_CREAT.indication.
Creation Timing: Created in case that a non-initiating MIH is able to accommodate a connection in response to the MIH_DATA_CREAT.indication.
Effect of Receipt: The CS transfers the MAC_CREATE_SERVIC FLOW.response to the MAC.

4) MIH_DATA_CREATE.confirmation
Function: Confirms that the connection requested by the MIH is created.
Creation Timing: Created by an initiating CS when a transmitting side CS receives the MAC_CREATE_SERVICE FLOW.confirmation.
Effect of Receipt: Confirms that the MIH enables a connection requested for the transfer of MIH data.

5) MIH_DATA_TERMINATE.request
Function: MIH requests CS to terminate a connection.
Creation Timing: Created when the MIH of the BS or the SS requests termination of an existing connection.
Effect of Receipt: The CS transfers the MAC_TERMINATE_SERVICE FLOW.request to the MAC.

6) MIH_DATA_TERMINATE.indication
Function: A non-initiating CS entity requests to terminate a connection corresponding to a MAC_TERMINATE_SERVICE FLOW.indication.
Creation Timing: Created when receiving the MAC_TERMINATE_SERVICE FLOW.indication message to terminate a connection.
Effect of Receipt: Receiving side MIH checks validity of request, returns an MIH_DATA_TERMINATE.response primitive and deletes connection-associated information from the MIH.

7) MIH_DATA_TERMINATE.response
Function: Used in making a response to a request to terminate a connection.
Creation Timing: Created when MIH receives an MIH_DATA_TERMINATE.indication from the CS.
Effect of Receipt: The CS sends a MAC_TERMINATE_SERVICE FLOW.response with instructions to send a DSD_RSP message.

8) MIH_DATA_TERMINATE.confirmation
Function: An MIH entity is made to confirm termination of a requested connection.
Creation Timing: Created when the CS receives the MAC_TERMINATE_SERVICE FLOW.response transmitted by the MAC having received the DSD-RSP message.
Effect of Receipt: Informs the MIH entity that a connection is terminated.

In accordance with another embodiment of the present invention, a second method for delivering data packets comprises a Communication Method Between MIHs Via a Control/Management Plane.

MAC management messages according to the present invention are explained as follows. When a mobile subscriber station makes a request before a base station, a MAC management message is represented as MOB_MSSMIH-REQ/RSP. When a base station makes a request before a mobile subscriber station, a MAC management message is represented as MOB_BSMIH-REQ/RSP.

Table 8 shows a format of a MOB_MSSMIH-REQ message.

TABLE 8

| Syntax | Size | Notes |
|---|---|---|
| MOB_MSSMIH-REQ_Message_Format( ) { | | |
| Management Message Type = xx | 8 bits | |
| TLV Encoded Information | Variable | Specific TLV |
| } | | |

In Table 8, coded parameters to enter a TLV tuple are different according to a content delivered by the MIH to a primitive. In the present embodiment, a content according to a primitive is delivered by transforming the content into a TLV format with a message of the same name. However, in case that a MAC Management Message according to a type of primitive is used according to a content of the primitive, the same effect can be achieved by delivering the content in a parameter format instead of the TLV format. Moreover, a mobile subscriber station is able to request an information service from a base station via the TLV.

Table 9 shows a format of a MOB_MSSMIH_RSP message.

TABLE 9

| Syntax | Size | Notes |
| --- | --- | --- |
| MOB_MSSMIH-RSP_Message_Format( ) { | | |
| Management Message Type = xx | 8 bits | |
| TLV Encoded Information | Variable | Specific TLV |
| } | | |

In Table 9, coded parameters to enter a TLV tuple are different according to a content delivered by the MIH to a primitive. In the present embodiment, a content according to a primitive is delivered by transforming the content into a TLV format with a message of the same name. However, in case that a MAC Management Message according to a type of primitive is used according to a content of the primitive, the same effect can be achieved by delivering the content in a parameter format instead of the TLV format. Moreover, a mobile subscriber station is able to request an information service from a base station via the TLV.

Table 10 shows a format of a MOB_BSMIH_REQ message.

TABLE 10

| Syntax | Size | Notes |
| --- | --- | --- |
| MOB_BSMIH-REQ_Message_Format( ) { | | |
| Management Message Type = xx | 8 bits | |
| TLV Encoded Information | Variable | Specific TLV |
| } | | |

In Table 10, coded parameters to enter a TLV tuple are different according to a content delivered by the MIH to a primitive. In the present embodiment, a content according to a primitive is delivered by transforming the content into a TLV format with a message of the same name. However, in case that a MAC Management Message according to a type of primitive is used according to a content of the primitive, the same effect can be achieved by delivering the content in a parameter format instead of the TLV format.

Table 11 shows a format of MOB_BSMIH_RSP message.

TABLE 11

| Syntax | Size | Notes |
| --- | --- | --- |
| MOB_BSMIH-RSP_Message_Format( ) { | | |
| Management Message Type = xx | 8 bits | |
| TLV Encoded Information | Variable | Specific TLV |
| } | | |

In Table 11, coded parameters to enter a TLV tuple are different according to a content delivered by the MIH to a primitive. In the present embodiment, a content according to a primitive is delivered by transforming the content into a TLV format with a message of the same name. However, in case that a MAC Management Message according to a type of primitive is used according to a content of the primitive, the same effect can be achieved by delivering the content in a parameter format instead of the TLV format.

Figure 14:
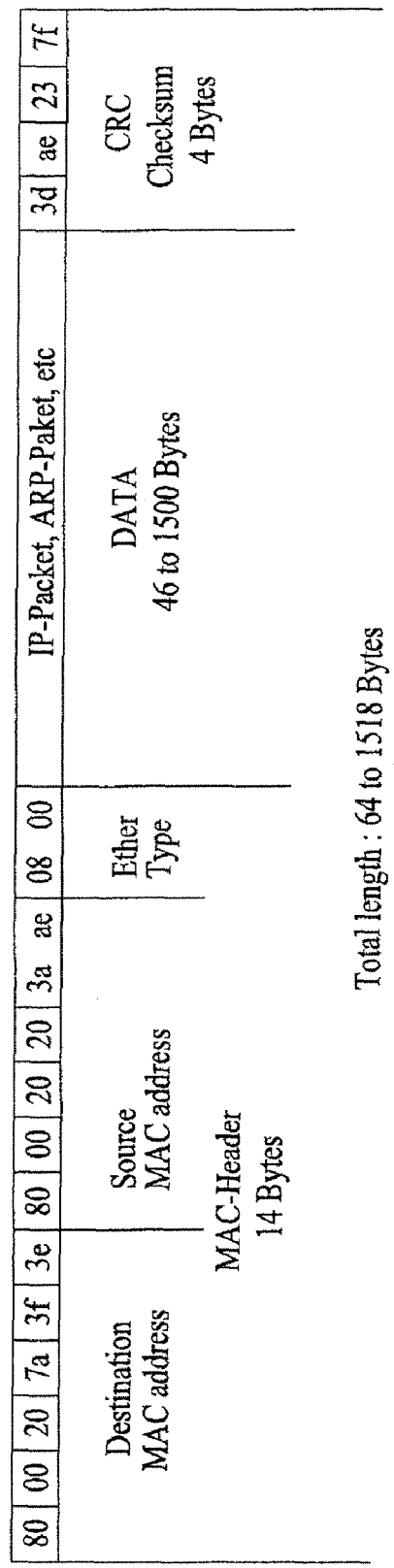
FIG. 14 illustrates an example of an Ethernet Frame format in accordance with one embodiment of the present invention.

FIG. 14 illustrates an example of an Ethernet Frame format in accordance with one embodiment of the present invention. Referring to FIG. 14, a new classifier is additionally defined to an Ether Type to identify whether data entering a DATA area is MIH data or general data (e.g., IP packet, etc.). Preferably, if this type of classifier is defined to other message formats, the MIH data can be classified from other data to be delivered to the MIH layer.

Figure 15:
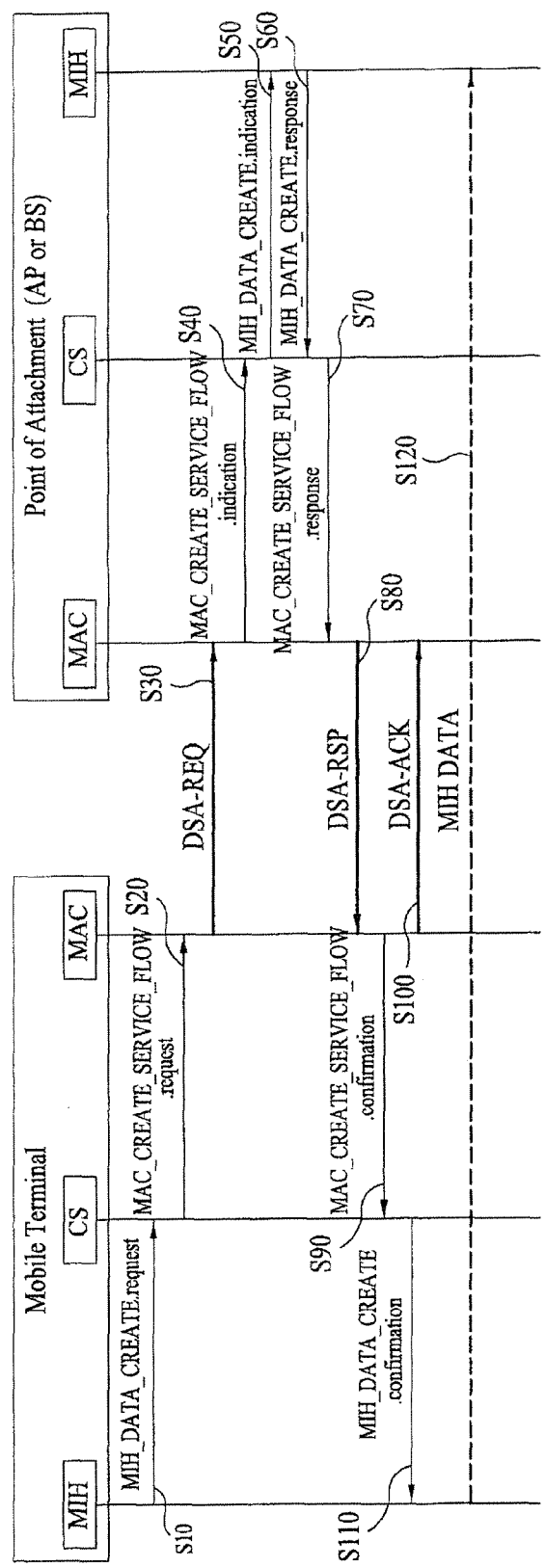
FIG. 15 is a flowchart of an inter-MIH connection creation procedure in accordance with a first embodiment of the present invention.
Figure 16:
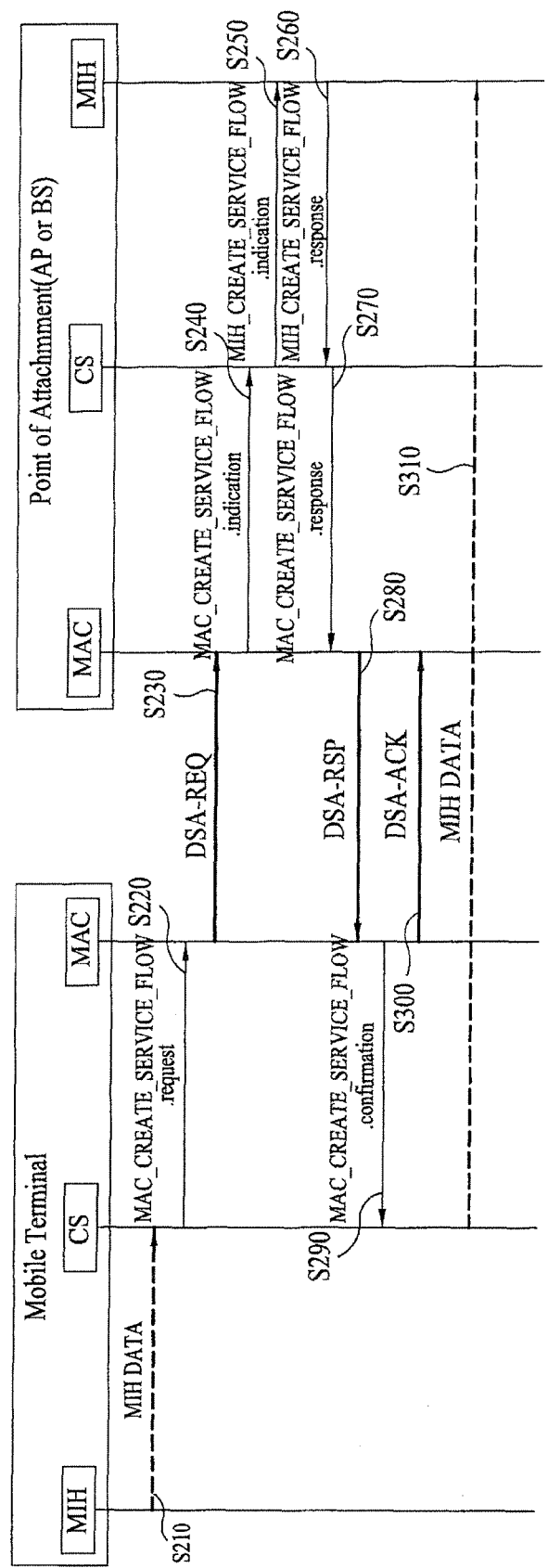
FIG. 16 is a flowchart of an inter-MIH connection creation procedure in accordance with a second embodiment of the present invention.

FIG. 15 is a flowchart of an inter-MIH connection creation procedure in accordance with a first embodiment of the present invention. FIG. 16 is a flowchart of an inter-MIH connection creation procedure in accordance with a second embodiment of the present invention. In the first embodiment of the present invention, after a connection between an SS side MIH and a BS side MIH has been created, the SS side MIH transmits MIH data to the BS side MIH.

In the second embodiment of the present invention, a calling side CS previously receives MIH data via an SAP. Once a connection between MIHs is created, MIH data is classified from general data and is then transmitted to a BS side. Preferably, the CS classifies the MIH data from the general data through the SAP or a data type. Preferably, when the SAP is used to classify the MIH data, an SAP for delivering the MIH data is different from an SAP for delivering general data.

A method for classifying the MIH data through a data type classifies MIH data from general data in a manner of checking a type of service data unit (SDU). Preferably, since the MIH data is delivered to the CS in an SDU, the CS checks a type of the delivered SDU to classify the MIH data from the general data. A classifier classifying the MIH data and the general data is similar to a classifier that classifies an Ethernet, Token Ring and the like. Preferably, the classifier decides what kind of protocol shall be used in delivering a message to a higher entity. In this case, connection creation can be achieved by an Ethertype/IEEE 802.2 SAP, wherein "Ethertype" is a message type newly defined to classify the MIH data.

A method for transmitting a data burst of a data packet format via a radio interface section from an SS side MIH in accordance with a first embodiment of the present invention will now be explained with reference to FIG. 15. Referring to FIG. 15, an SS side MIH requests a CS to provide a service connection creation for MIH data transfer (S10). The CS then delivers the service connection creation request made by the MIH to a MAC (S20).

The SS side MAC having received the request from the CS requests a BS side MAC to provide a new service connection creation via a MAC management message (S30). The BS side MAC then notifies a BS side MIH via a CS that the MAC management message for the service connection creation request was received from a peer (S40, S50).

In case of receiving the notification of the service connection creation request from the SS side, the BS side MIH decides whether to accept or reject the request. If it is decided that the connection creation will be accepted, the BS side MIH orders a MAC layer to transmit a MAC management message indicating the creation of a service connection (S60, S70). However, if a decision whether to accept the request made by the SS side is carried out by the CS, then the procedure involving the MIH layer can be omitted (S50, S60).

The BS side MAC then transmits a response MAC management message to the SS side MAC (S80). The SS side MAC layer having received the response MAC management message notifies the CS layer of the message (S90). Meanwhile, the SS side MAC layer also informs the BS side MAC that a DSA-RSP message was successfully received, via a DSA-ACK message (S100).

The SS side CS layer having received the response message for the service connection creation notifies the MIH layer of the message (S110). After completion of the service connection creation, the MIH transfers MIH data to the CS layer. The CS layer then maps a service connection creation identifier established for MIH data transfer to a connection identifier for transfer via radio interface to transfer data. Afterward, a receiving side CS extracts the MIH data from the received data using the service connection identifier and transfers the extracted data to the MIH (S120).

A method for transmitting a data burst of a data packet format via a radio interface section from an SS side MIH in accordance with a second embodiment of the present invention will be explained with reference to FIG. 16. Referring to FIG. 16, MIH data is delivered to a CS (S210). Preferably, the MIH data is delivered to the CS via a separate SAP defined between the MIH and the CS or an SAP connected to an upper layer. If the delivery is conducted via the separate SAP, the CS recognizes the MIH data. If the delivery is conducted via an SAP used for delivering data that is not exclusively MIH data, the MIH data is recognized according to a classifier (type) included in the data.

The CS having received the MIH data delivers a service connection creation request to an SS side MAC (S220). The SS side MAC having received the request from the CS requests a BS side MAC to provide a new service connection creation via a MAC management message (S230).

The BS side MAC then notifies a BS side MIH via a CS that the MAC management message for the service connection creation request was received from a peer (S240, S250). In case of receiving the notification of the service connection creation request from the SS side, the BS side MIH decides whether to accept or reject the request. If it is decided that the connection creation will be accepted, the BS side MIH orders a MAC layer to transmit a MAC management message indicating a creation of a service connection (S260, S270). However, if a decision whether to accept the request made by the SS side is carried out by the CS, then the procedure involving the MIH layer can be omitted.

The BS side MAC then transmits a response MAC management message to the SS side MAC (S280). The MAC layer having received the response MAC management message notifies the CS layer of the message (S290). Meanwhile, the SS side MAC layer also informs the BS side MAC layer that a DSA-RSP message was successfully received, via a DSA-ACK message (S300).

After completion of the service connection creation, the CS layer maps a service connection creation identifier established for MIH data transfer to a connection identifier for transfer via radio interface to transfer data. Afterward, the BS side CS classifies the received data for transfer to the MIH using the service connection identifier and transfers the classified data to the MIH (S310).

Figure 17:
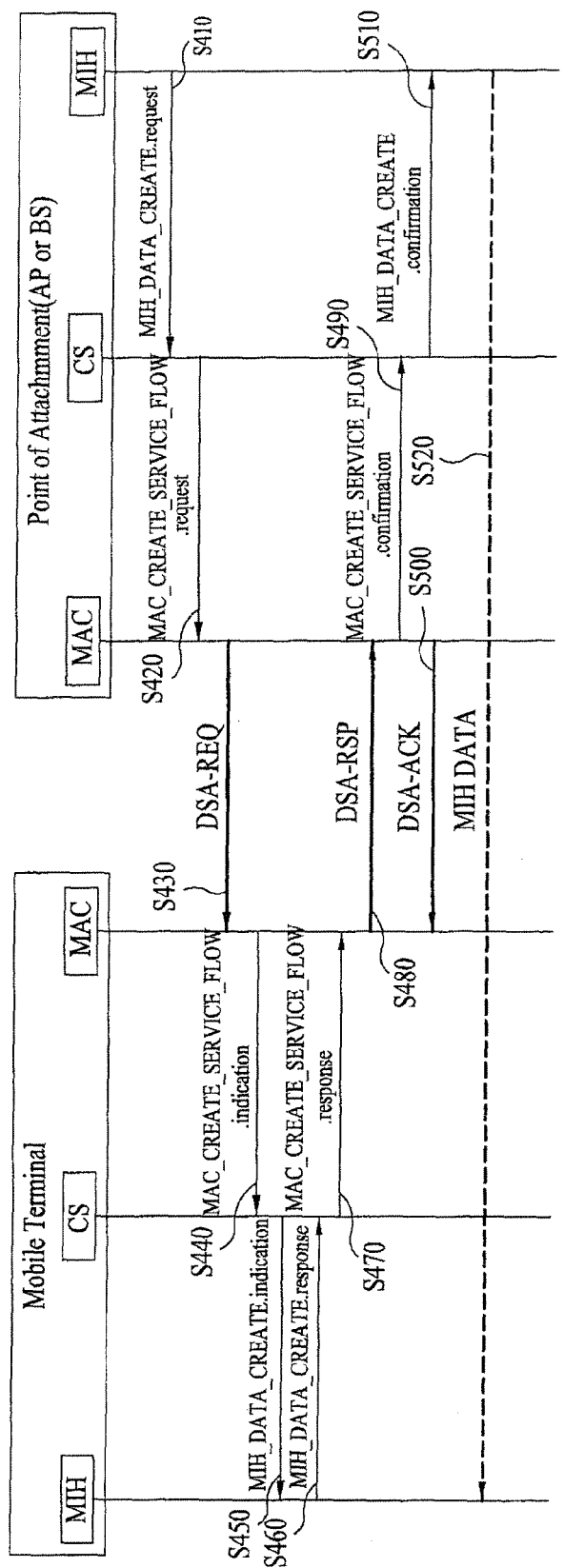
FIG. 17 illustrates a method for transmitting a data burst of a data packet format via a radio interface section from a BS side MIH in accordance with a first embodiment of the present invention.
Figure 18:
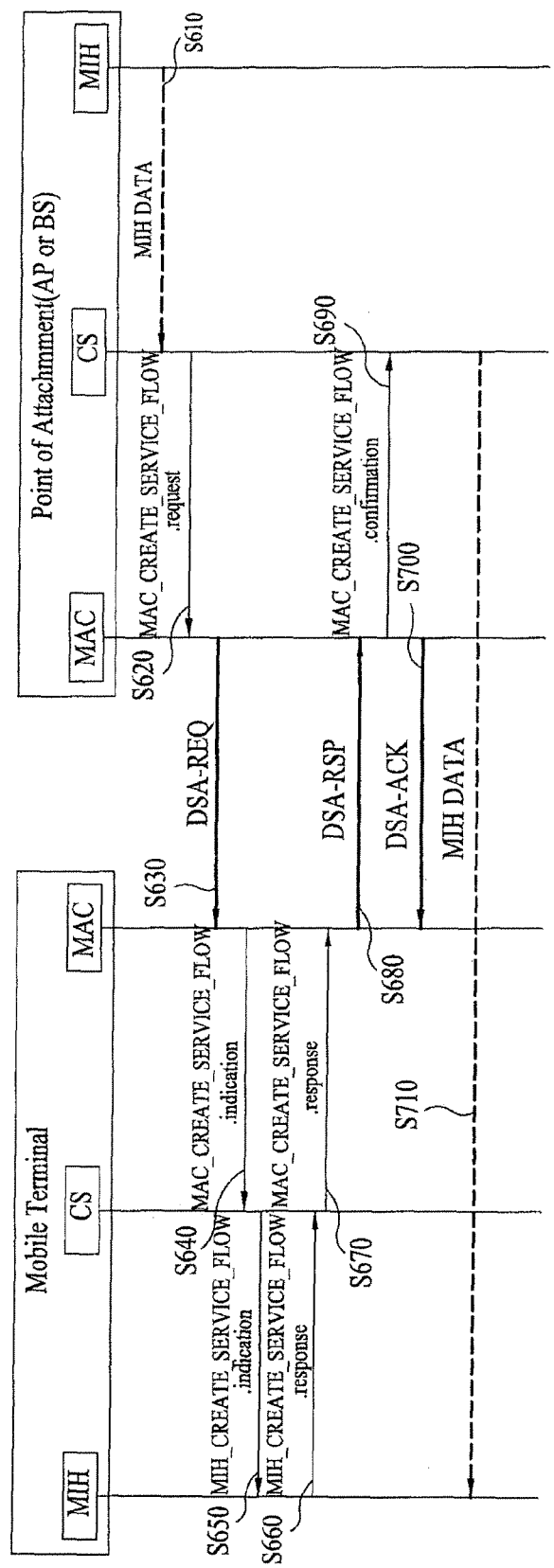
FIG. 18 illustrates a method for transmitting a data burst of a data packet format via a radio interface section from a BS side MIH in accordance with a second embodiment of the present invention.

FIG. 17 illustrates a method for transmitting a data burst of a data packet format via a radio interface section from a BS side MIH in accordance with a first embodiment of the present invention. FIG. 18 illustrates a method for transmitting a data burst of a data packet format via a radio interface section from a BS side MIH in accordance with a second embodiment of the present invention.

A method for transmitting a data burst of a data packet format via a radio interface section from a BS side MIH in accordance with a first embodiment of the present invention will now be explained with reference to FIG. 17.

Referring to FIG. 17, a BS side MIH requests a CS to provide a service connection creation for MIH data transfer (S410). The CS then delivers the service connection creation request made by the MIH to a MAC (S420). The BS side MAC having received the request from the CS requests an SS side MAC to provide a new service connection creation via a MAC management message (S430). The SS side MAC then notifies an SS side MIH via a CS that the MAC management message for the service connection creation request was received from a peer (S440, S450).

In case of receiving the notification of the service connection creation request from the BS side, the SS side MIH decides whether to accept or reject the request. If it is decided that the connection creation will be accepted, the SS side MIH orders a MAC layer to transmit a MAC management message indicating the creation of a service connection (S460, S470). However, if a decision whether to accept the request made by the BS side is carried out by the CS, a procedure involving the MIH layer can be omitted.

The SS side MAC then transmits a response MAC management message to the BS side MAC (S480). The MAC layer having received the response MAC management message notifies the CS layer of the message (S490). Meanwhile, the MAC layer informs the SS side that a DSA-RSP message was successfully received, via a DSA-ACK message (S500).

The BS side CS layer having received the response message for the service connection creation notifies the MIH layer of the message (S510). After completion of the service connection creation, the MIH transfers the MIH data to the CS layer. The CS layer then maps a service connection creation identifier established for MIH data transfer to a connection identifier for transfer via radio interface to transfer data. Afterward, a receiving side CS extracts the MIH data from the received data using the service connection identifier and transfers the extracted data to the MIH (S520).

A method for transmitting a data burst of a data packet format via a radio interface section from a BS side MIH in accordance with a second embodiment of the present invention will be explained with reference to FIG. 18. Referring to FIG. 18, MIH data is delivered to a CS (S610). Preferably, the MIH data is delivered to the CS via a separate SAP defined between the MIH and the CS or an SAP connected to an upper layer. If the delivery is conducted via the separate SAP, the CS recognizes the MIH data. If the delivery is conducted via an SAP used for delivering data that is not exclusively MIH data, the MIH data is recognized according to a classifier (type) included in the data.

The CS having received the MIH data delivers a service connection creation request to a BS side MAC (S620). The BS side MAC having received the request from the CS requests the SS side MAC to provide a new service connection creation via a MAC management message (S630).

The SS side MAC then notifies an SS side MIH via a CS that the MAC management message for the service connection creation request was received from a peer (S640, S650). In case of receiving the notification of the service connection creation request from the BS side, the SS side MIH decides whether to accept or reject the request. If it is decided that the connection creation will be accepted, the SS side MIH orders a MAC layer to transmit a MAC management message indicating the creation of a service connection (S660, S670). However, if a decision whether to accept the request made by the BS side is carried out by the CS, a procedure involving the MIH layer can be omitted.

The SS side MAC then transmits a response MAC management message to the SS side MAC (S680). The MAC layer having received the response MAC management message notifies the CS layer of the message (S690). Meanwhile, the MAC layer also informs the SS side that a DSA-RSP message was successfully received, via a DSA-ACK message (S700).

After completion of the service connection creation, the CS layer maps a service connection creation identifier established for MIH data transfer to a connection identifier for transfer via radio interface to transfer data. Afterward, a receiving side CS extracts the MIH data from the received data using the service connection identifier and transfers the extracted data to the MIH (S710).

Figure 19:
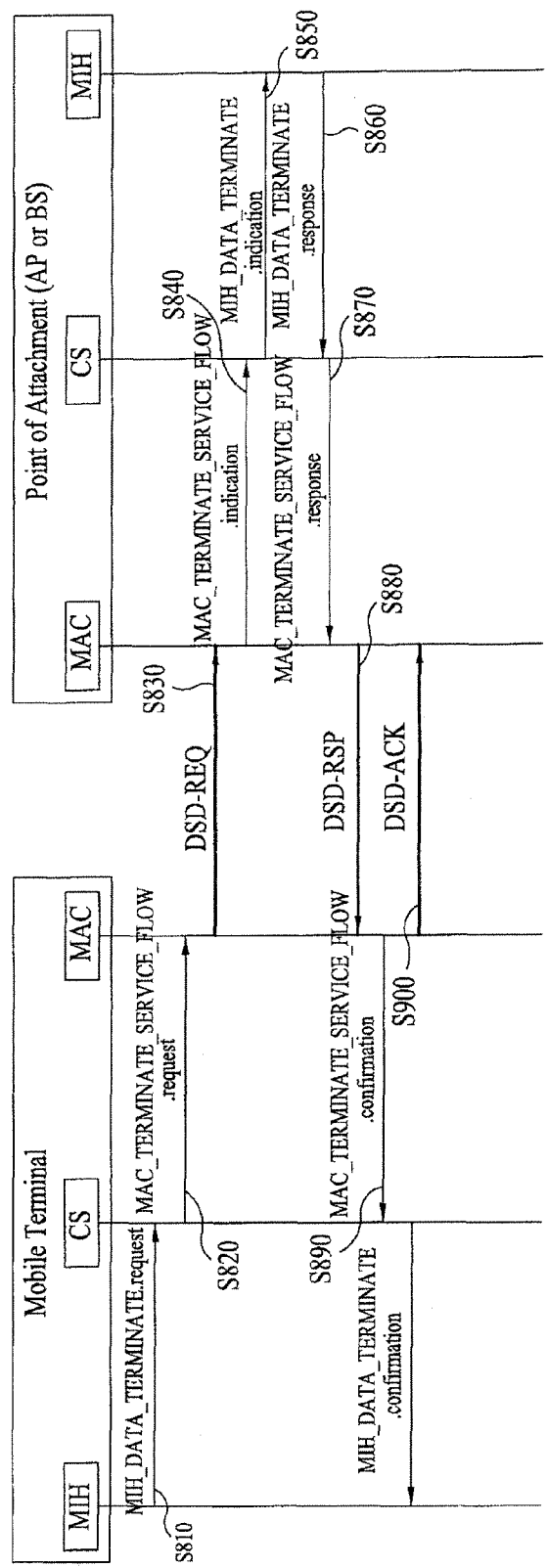
FIG. 19 is a flowchart of an inter-MIH connection release procedure by a mobile subscriber station, in accordance with a first embodiment of the present invention.

FIG. 19 is a flowchart of an inter-MIH connection release procedure by a mobile subscriber station, in accordance with a first embodiment of the present invention. Referring to FIG. 19, an SS side MIH requests a CS to release a service connection creation for MIH data transfer (S810). The CS then delivers the service connection creation release request made by the MIH to a MAC (S820).

The SS side MAC having received the request from the CS requests a BS side MAC to release the service connection creation via a MAC management message (S830). The BS side MAC then notifies a BS side MIH via a CS that the MAC management message for the service connection creation release request was received from a peer (S840, S850).

In case of receiving the notification of the service connection creation release request from the SS side, the BS side MIH decides whether to accept or reject the request. If it is decided that the release of the connection creation will be accepted, the BS side MIH orders a MAC layer to transmit a MAC management message indicating a release of a service connection creation (S860, S870). However, if a decision whether to accept the request made by the SS side is carried out by the CS, the procedure involving the MIH can be omitted.

The BS side MAC then transmits a response MAC management message to the SS side MAC (S880). The SS side MAC layer having received the response MAC management message notifies the CS layer of the message (S890). Meanwhile, the SS side MAC layer also informs the BS side MAC that a DSD-RSP message was successfully received, via a DSD-ACK message (S900).

Figure 20:
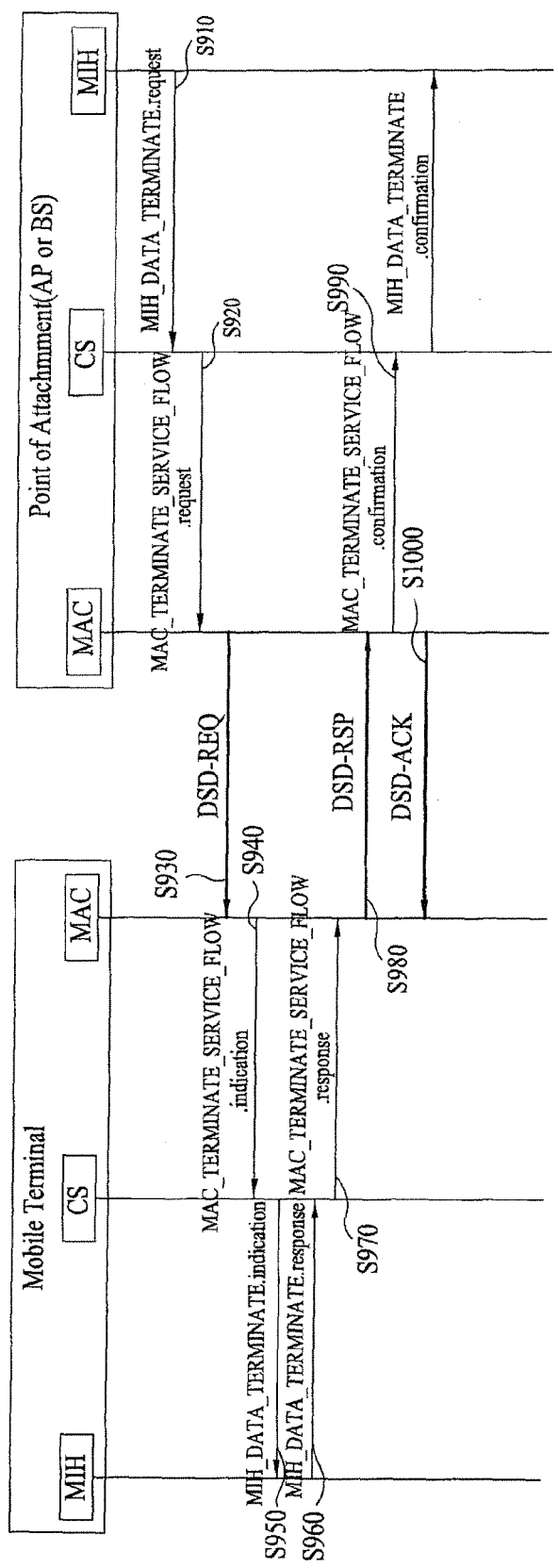
FIG. 20 is a flowchart of an inter-MIH connection release procedure by a base station, in accordance with a first embodiment of the present invention.

FIG. 20 is a flowchart of an inter-MIH connection release procedure by a base station, in accordance with a first embodiment of the present invention. Referring to FIG. 20, a BS side MIH requests a CS to release a service connection creation for MIH data transfer (S910). The CS then delivers the service connection creation release request made by the MIH to a MAC (S920).

The BS side MAC having received the request from the CS requests an SS side MAC to release the service connection creation via a MAC management message (S930). The SS side MAC then notifies an SS side MIH via a CS that the MAC management message for the service connection creation release request was received from a peer (S940, S950).

In case of receiving the notification of the service connection creation release request from the BS side, the SS side MIH decides whether to accept or reject the request. If it is decided that release of the connection creation will be accepted, the SS side MIH orders a MAC layer to transmit a MAC management message indicating a release of a service connection creation (S960, S970). However, if a decision whether to accept the request made by the BS side is carried out by the CS, a procedure involving the MIH layer can be omitted.

The SS side MAC then transmits a response MAC management message to the BS side MAC (S980). The BS side MAC layer having received the response MAC management message notifies the CS layer of the message (S990). Meanwhile, the BS side MAC layer also informs the SS side MAC that a DSD-RSP message was successfully received, via a DSD-ACK message (S1000).

Figure 21:
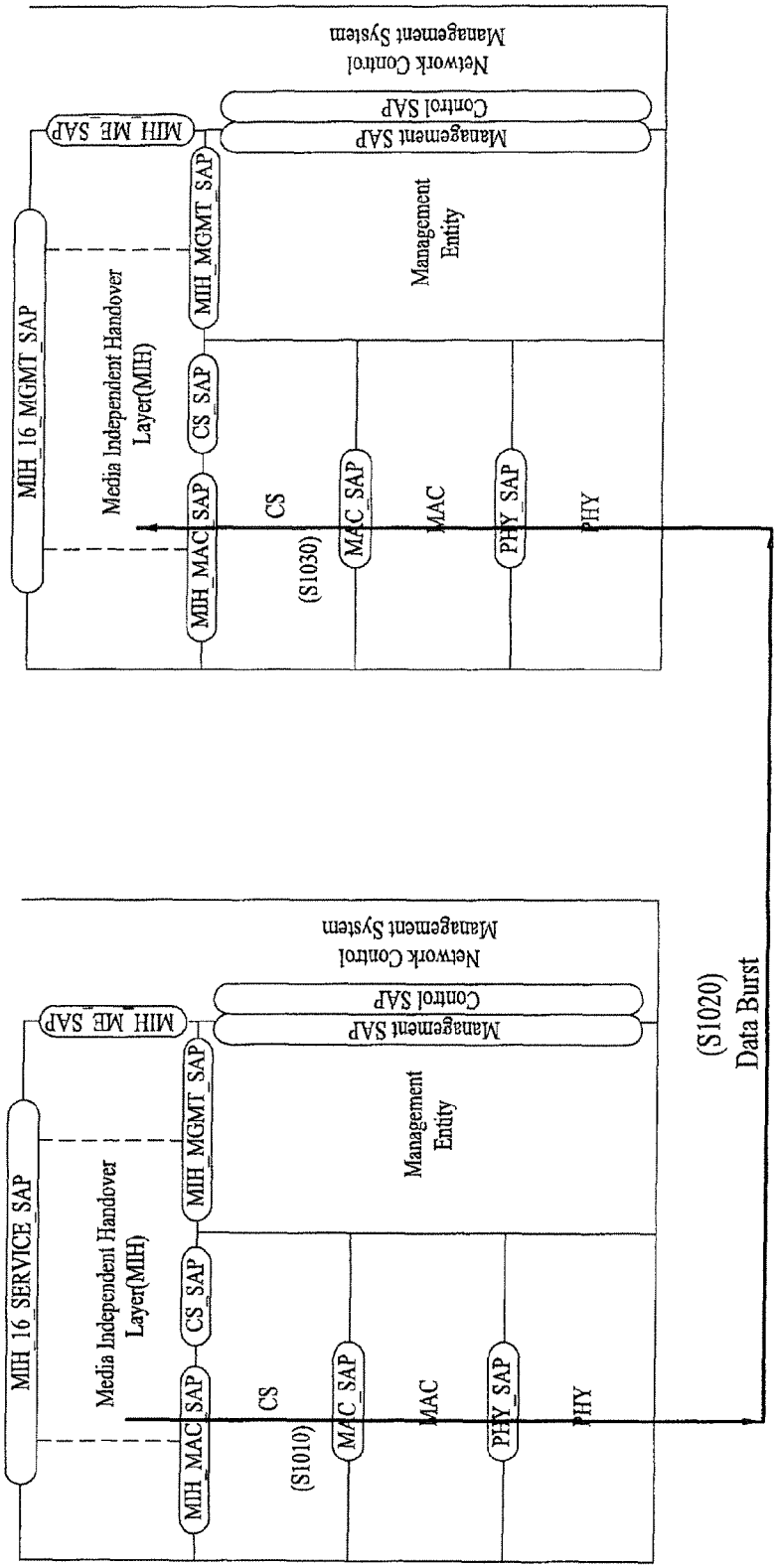
FIG. 21 is a diagram of an inter-MIH signal exchange procedure in accordance with a first embodiment of the present invention.

FIG. 21 is a diagram of an inter-MIH signal exchange procedure in accordance with a first embodiment of the present invention. Referring to FIG. 21, an MIH layer transfers an MIH message to a CS layer (S1010). Preferably, a service connection creation for this MIH message transfer may be accomplished by one of the two methods shown in FIGS. 15 and 16, respectively.

A service flow identifier created in the service connection creation for the MIH data transfer and a connection identifier (ID) used for identification in a MAC layer are mapped to each other and are transferred via a radio section (S1020). The CS, having received the service flow identifier and connection identifier, recognizes the transferred MIH data by mapping the connection identifier to the service flow identifier previously created in the service connection creation. The CS then delivers the MIH data to an MIH layer (S1030). Preferably, the delivery to the MIH layer can be achieved via a separate SAP (MIH_MAC_SAP) between the CS and the MIH, or an SAP (CS_SAP) connected to higher protocols having the MIH's identification using a new classifier (e.g., Ether Type).

Figure 22:
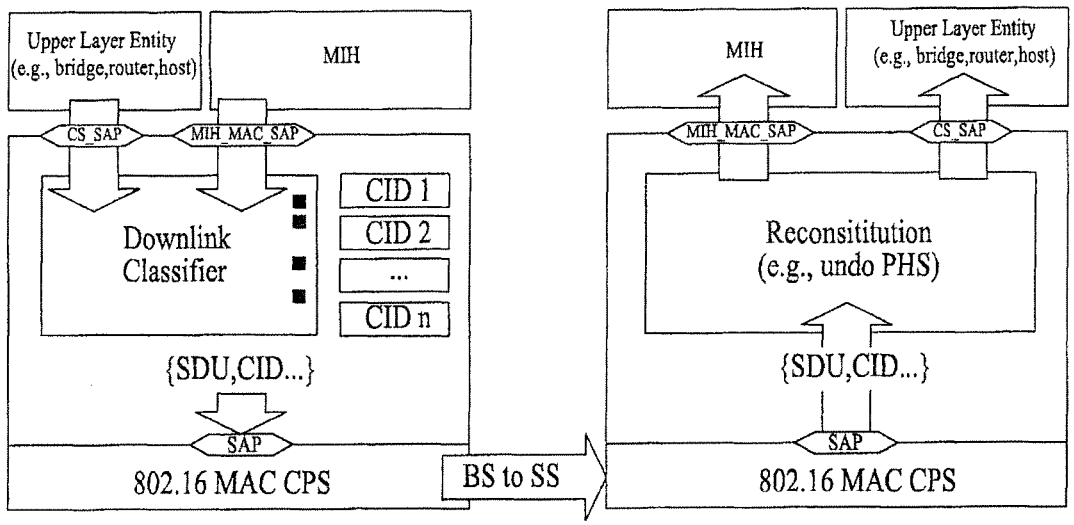
FIG. 22 illustrates an operation between a convergence sublayer (CS) and an MIH (BS to SS), wherein a base station establishes a service connection creation to send data in accordance with one embodiment of the present invention.

FIG. 22 illustrates an operation between a CS and an MIH (BS to SS), wherein a base station establishes a service connection creation to send data in accordance with one embodiment of the present invention. Once a service connection creation is accomplished, a service flow ID is created and mapping between the newly created ID and a connection ID, used for a MAC layer to transmit data via a radio interface, is performed in the CS layer. A transmitting side similarly decides a protocol to deliver to an upper layer by mapping a transferred connection ID to a service flow ID.

In performing a service, MIH data may be explicitly indicated, or a protocol on an upper layer for receiving MIH data may be made to selectively receive MIH data by setting a classifier (Type) of the Ethernet frame to the MIH. If the classifier is set to the MIH, an MIH layer receives the MIH data.

Figure 23:
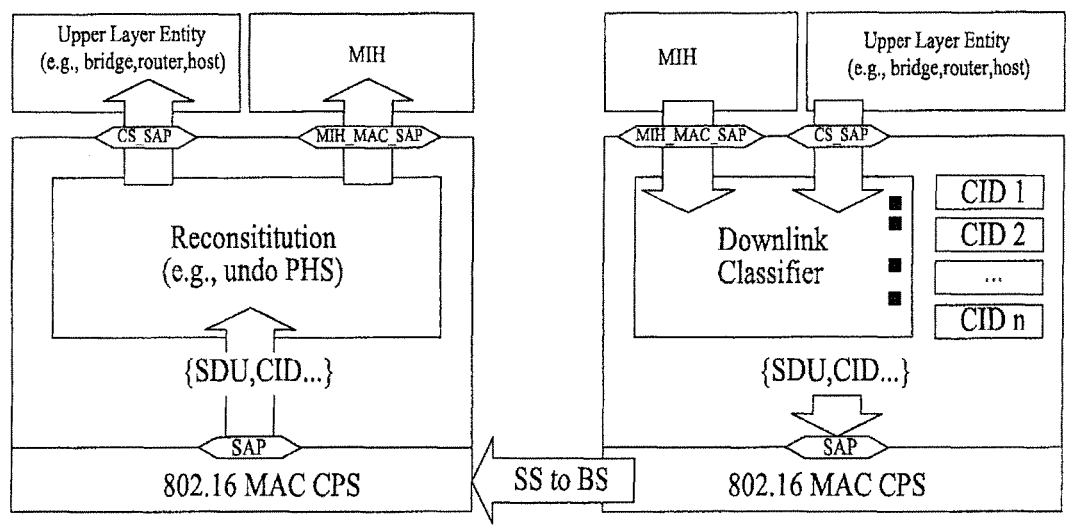
FIG. 23 illustrates an operation between a CS and an MIH (SS to BS), wherein a subscriber station establishes a service connection creation to send data in accordance with one embodiment of the present invention.

FIG. 23 illustrates an operation between a CS and an MIH (SS to BS), wherein a subscriber station establishes a service connection creation to send data in accordance with one embodiment of the present invention. Preferably, an operation procedure of the embodiment shown in FIG. 23 is carried out in an inverse order of that in FIG. 22.

Figure 24:
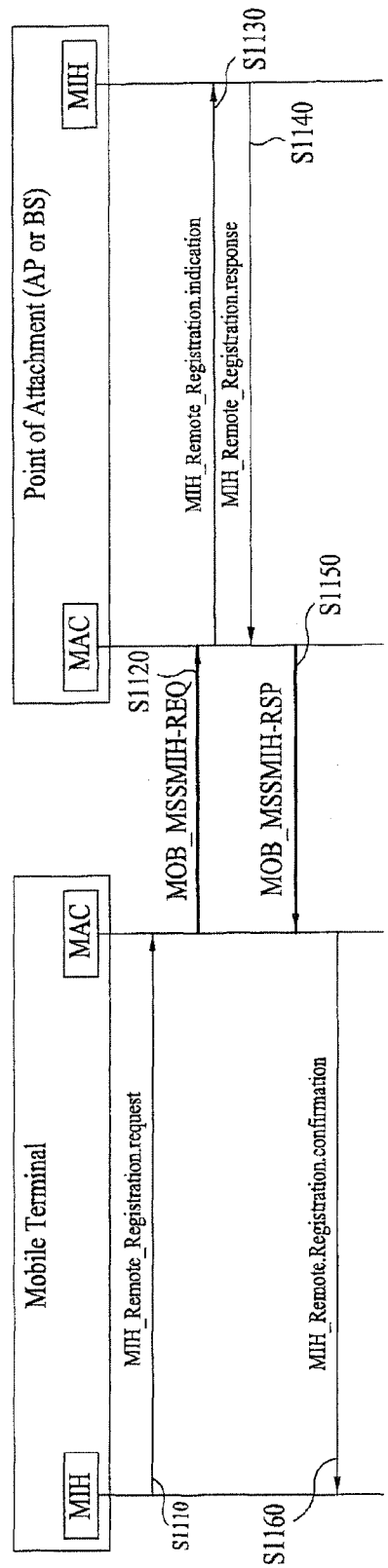
FIG. 24 is a flowchart of an inter-MIH connection creation procedure by an SS side MIH in accordance with one embodiment of the present invention.

FIG. 24 is a flowchart of an inter-MIH connection creation procedure by an SS side MIH in accordance with one embodiment of the present invention. In accordance with one embodiment, an MIH may make a remote registration, for example. However, a method for remotely delivering an MIH message via a MAC management message is identical. Preferably, an MIH-associated MAC management message proposed by the present invention is delivered in a TLV format according to a content of a primitive delivered from a higher layer, wherein the delivered MAC management message is delivered to an MIH layer. The delivery to the MIH layer from the MAC layer can be conducted so that the message is delivered from the MAC layer via a management entity, to the MIH layer via a Network Control and Management Service in a primitive format or via a separate SAP between the management entity and the MIH layer.

A procedure for exchanging signals between MIHs via MAC management messages is explained with reference to FIG. 24. In the present embodiment, the signals are exchanged through a registration request and response. In other cases, a method for remotely delivering an MIH message is similar, but attributes are classified according to a content of the TLV.

Referring to FIG. 24, an SS side MIH remotely makes a request for an MIH registration to a MAC layer (S1110). The MAC layer then transmits a MAC management message for a remote registration to a BS (base station) (S1120). Once receiving the MAC management message for the remote registration, a BS side MAC layer delivers the message to a BS side MIH (S1130). The BS side MIH then creates a response message for the remote registration and transfers it to the BS side MAC layer (S1140).

The BS side MAC layer loads a primitive content of the remote registration response message delivered from the MIH on a MAC management message and transmits it to a subscriber station (SS) (S1150). The SS side MAC layer having received the MAC management message then delivers the remote registration response message to the SS side MIH layer (S1160).

Figure 25:
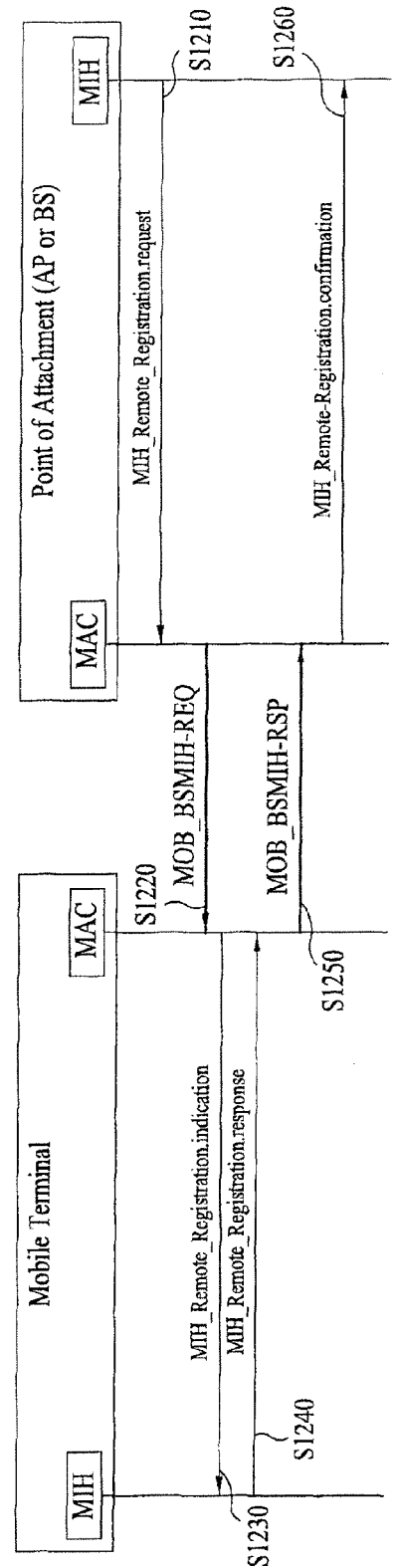
FIG. 25 is a flowchart of an inter-MIH connection creation procedure by a base station in accordance with one embodiment of the present invention.

FIG. 25 is a flowchart of an inter-MIH connection creation procedure by a base station in accordance with one embodiment of the present invention. A procedure for exchanging signals between MIHs via MAC management messages is explained with reference to FIG. 25. Referring to FIG. 25, a BS side MIH remotely makes a request for an MIH registration to a BS side MAC layer (S1210). The BS side MAC layer then transmits a MAC management message for a remote registration to an SS (subscriber station) (S1220).

Once receiving the MAC management message for the remote registration, an SS side MAC layer delivers the message to an SS side MIH (S1230). The SS side MIH then creates a response message for the remote registration and transfers it to the SS side MAC layer (S1240).

The SS side MAC layer loads a primitive content of the remote registration response message delivered from the MIH on a MAC management message and then transmits it to a base station (BS) (S1250). The BS side MAC layer having received the MAC management message then delivers the remote registration response message with the primitive to the BS side MIH layer (S1260).

Figure 26:
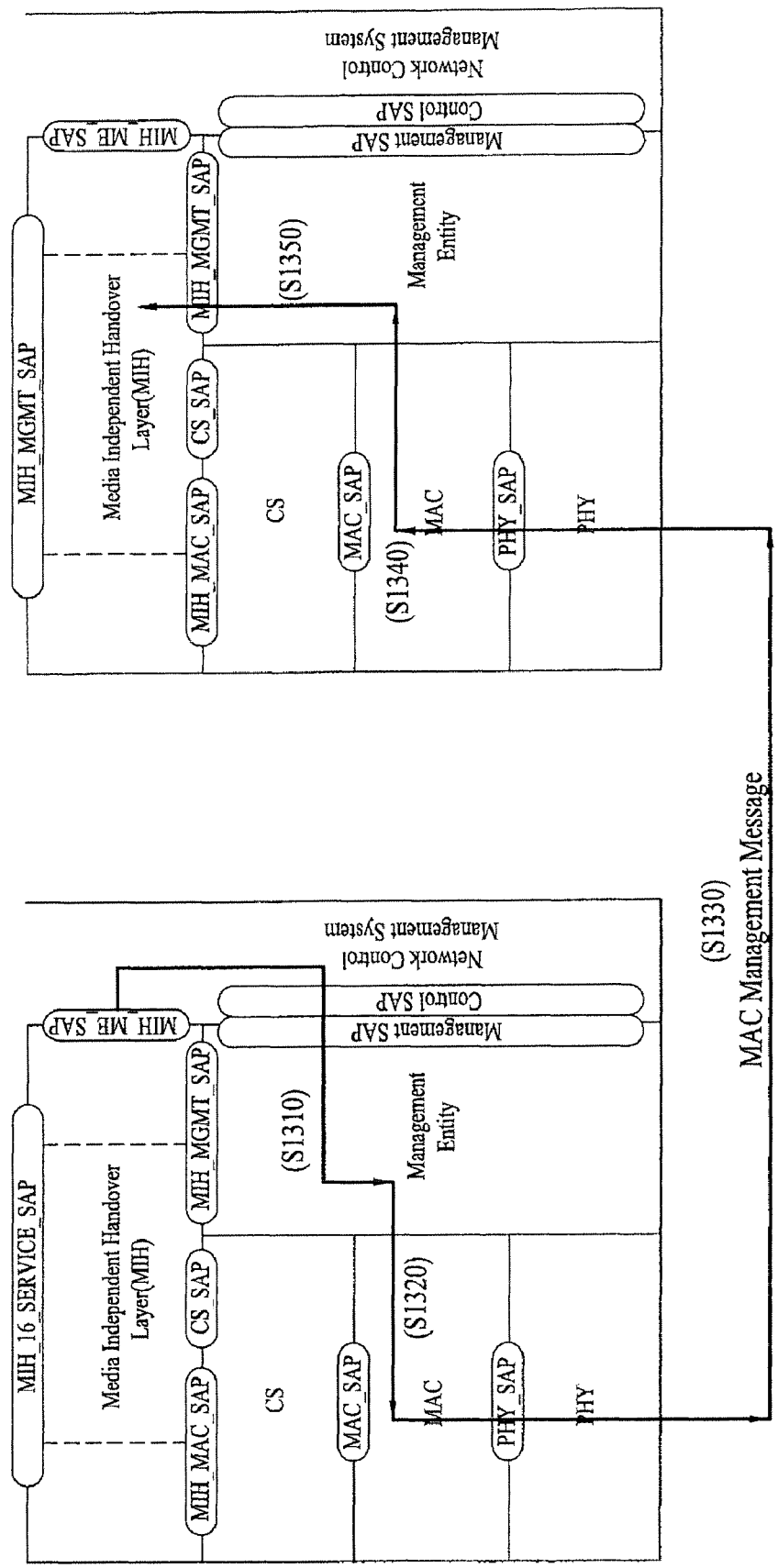
FIG. 26 illustrates a signal exchange via a protocol stack architecture in accordance with one embodiment of the present invention.

FIG. 26 illustrates a signal exchange via a protocol stack architecture in accordance with one embodiment of the present invention. An inter-MIH signal exchange procedure according to one embodiment of the present invention will be explained. In the present embodiment, a transfer procedure from a subscriber station (SS) to a base station (BS) is described. Notably, a transfer procedure from the BS to the SS is executed in an order inverse to that of the embodiment shown in FIG. 26.

Referring to FIG. 26, an MIH layer delivers a primitive of a message to be remotely delivered to a management entity (S1310). Preferably, the primitive is delivered to the management entity via an MIH_MGMT_SAP. Alternatively, the primitive may be delivered to the management entity via an MIH_ME_SAP through a Network Control and Management System and a Management SAP (or Control SAP).

The primitive is then delivered to a MAC layer from the management entity (S1320). Preferably, the MAC layer creates a MAC management message and loads a content of the primitive delivered via the management entity on the created message (S1320). The MAC layer then transmits the message to a base station (BS) via a physical layer (S1330). In doing so, a management connection identifier (e.g., Basic CID or Primary/Secondary management CID) is used as a connection identifier (ID). Hence, the MAC management message can be transmitted from a point in time where the connection ID for this management is allocated.

Preferably, the MAC management message, which is created for an MIH message, is delivered to the base station via a radio interface. The MAC management message received by the base station is delivered to a MAC layer via a physical layer (S1340).

The BS side MAC layer then creates a primitive corresponding to the content of the received message and delivers the primitive to an MIH (S1350). In a corresponding delivery path, as mentioned in the foregoing description, the primitive can be directly delivered to the MIH layer via a specific SAP through a management entity. Alternatively, the primitive can be delivered to the MIH layer via a Network Control and Management System.

Figure 27:
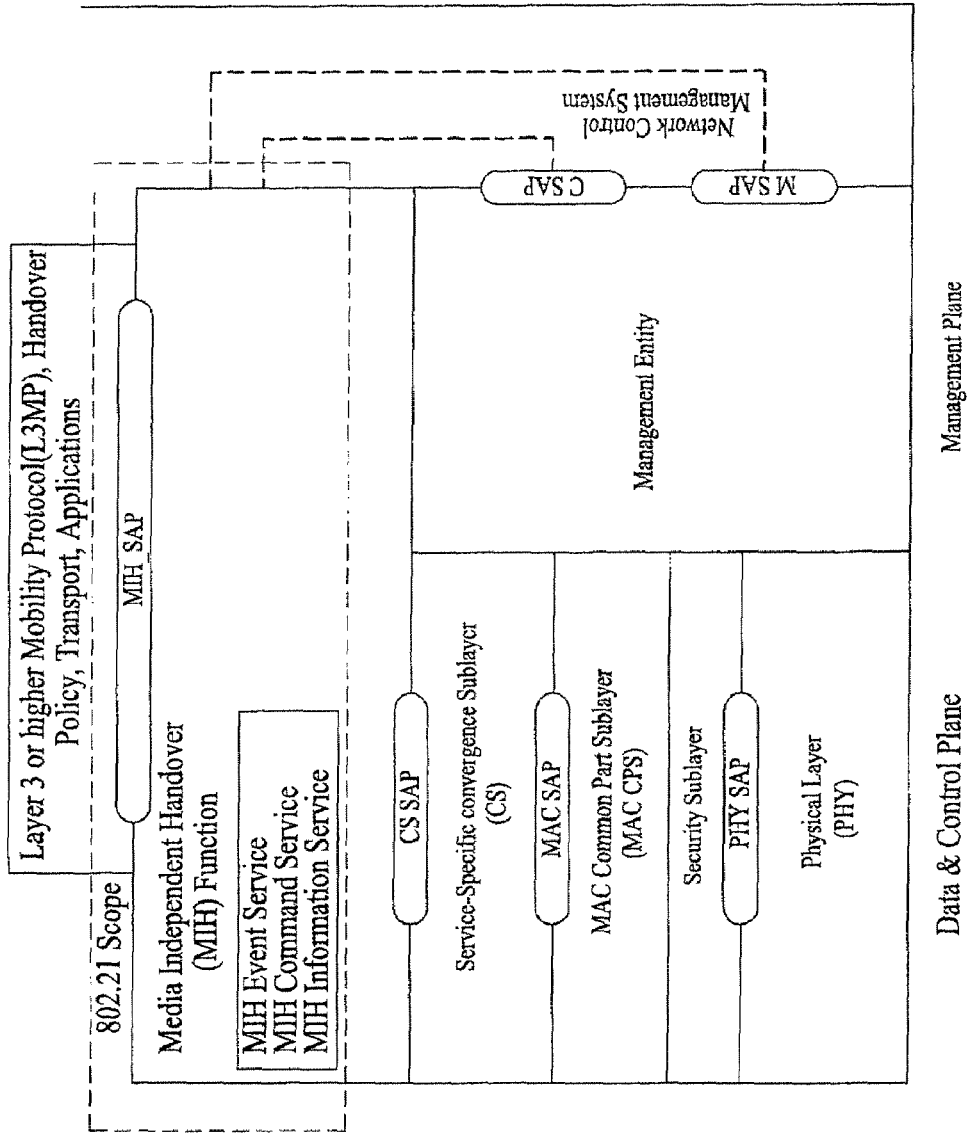
FIG. 27 illustrates a signal exchange via a protocol stack architecture in accordance with one embodiment of the present invention.

FIG. 27 illustrates a signal exchange via a protocol stack architecture in accordance with one embodiment of the present invention. Referring to FIG. 27, an MIH layer delivers a primitive of a message to be remotely delivered to a management entity. Preferably, the primitive is delivered to the management entity through one of a control service access point (C_SAP) and a management service access point (M_SAP).

Accordingly, the present invention provides the following effects or advantages, First, messages can be remotely exchanged via a radio section between MIH layers of a base station and a multi-mode terminal (e.g., mobile subscriber station in at least two of a broadband wireless access network, a wireless LAN, a wire LAN and a cellular system). Specifically, in case that an MIH message is remotely delivered via a MAC management message, a message transfer can be performed as soon as a management connection identifier is allocated. So, the message exchange is enabled even if a network entry procedure is not completed. Hence, media independent handover can be performed more quickly.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal for use in a mobile communication system, the mobile terminal comprising:
    an upper layer entity including a media independent handover function (MIHF) which provides services for handover between heterogeneous networks; and
    a lower layer entity comprising a convergence sublayer (CS), the lower layer entity receiving a service flow creation request primitive from the upper layer entity, transmitting a request in response to the service flow creation request primitive, and transferring a service flow creation response primitive to the upper layer entity of the mobile terminal after receiving a response to the request, wherein the request and the response are associated with creation of a service flow.

2. The mobile terminal of claim 1, wherein:
    the request and the response are for communicating a protocol message between the mobile terminal and a network; and the protocol message is a heterogeneous protocol message configured to be transmitted to the network through a frame having an identifier for distinguishing the heterogeneous protocol message.

3. The mobile terminal of claim 2, wherein the heterogeneous protocol message comprises at least event data, command data or information data.

4. The mobile terminal of claim 2, wherein the mobile terminal is configured to transmit the heterogeneous protocol message to a media independent handover function (MIHF) of the network.

5. The mobile terminal of claim 1, wherein the mobile terminal is configured to transmit an acknowledgment for acknowledging successful receipt of the response.

6. The mobile terminal of claim 1, wherein the response includes Quality of Service (QoS) parameters of the service flow.

* * * * *